United States Patent [19]

Tanaka et al.

[11] Patent Number: 5,802,300
[45] Date of Patent: Sep. 1, 1998

[54] AUDIO VIDEO SYSTEM

[75] Inventors: Shigeo Tanaka, Tokyo; Hiroshi Yamazaki, Kanagawa; Noriko Kotabe, Chiba; Kouichi Sugiyama, Kanagawa; Makoto Sato, Kanagawa; Akira Katsuyama, Kanagawa; Yoshio Osakabe, Kanagawa; Yasuo Kusagaya, Tokyo, all of Japan

[73] Assignee: Sony Corporation, Tokyo, Japan

[21] Appl. No.: 585,777

[22] Filed: Jan. 16, 1996

Related U.S. Application Data

[62] Division of Ser. No. 168,374, Dec. 17, 1993, Pat. No. 5,550,979.

[30] Foreign Application Priority Data

Dec. 28, 1992 [JP] Japan ........................... 4-361412

[51] Int. Cl.⁶ ........................................... G06F 13/00
[52] U.S. Cl. ............... 395/200.52; 395/651; 340/825.25
[58] Field of Search .......................... 395/200.05, 200.11, 395/290, 200.38, 200.54, 200.5, 200.51, 200.52, 200.39, 651, 652, 653; 370/461; 340/825.24, 825.25, 825.5, 825.51, 825.3, 825.63; 364/132, 230.1, 230.4, 241.6, 242.6, 242.7, 242.8, 242.92, 242.93, 935.41, 937.01, 942.4

[56] References Cited

U.S. PATENT DOCUMENTS

| | | |
|---|---|---|
| 4,347,515 | 8/1982 | Marino . |
| 4,359,731 | 11/1982 | Beauford et al. . |
| 4,429,384 | 1/1984 | Kaplinsky ............... 340/825.63 |
| 4,536,874 | 8/1985 | Stoffel et al. ........... 340/825.5 |
| 4,680,583 | 7/1987 | Grover ................... 340/825.5 |
| 4,920,486 | 4/1990 | Nielson ................. 364/242.92 |
| 4,972,184 | 11/1990 | Go et al. ............... 340/825.5 |
| 4,990,907 | 2/1991 | Jikihara et al. ........ 340/825.5 |
| 5,012,468 | 4/1991 | Siegel et al. . |
| 5,029,209 | 7/1991 | Strong, Jr. et al. ..... 340/825.5 |
| 5,054,022 | 10/1991 | Van Steenbrugge ..... 340/825.5 |
| 5,073,773 | 12/1991 | Van Steenbrugge et al. .... 340/825.3 |
| 5,132,679 | 7/1992 | Kubo et al. ............. 340/825.24 |
| 5,187,708 | 2/1993 | Nakatani et al. ........ 340/825.25 |
| 5,193,208 | 3/1993 | Yokota et al. ........... 340/825.25 |
| 5,204,662 | 4/1993 | Goto ...................... 395/200.05 |
| 5,223,825 | 6/1993 | Ikezaki .................. 340/825.25 |
| 5,237,695 | 8/1993 | Skokam et al. . |
| 5,276,703 | 1/1994 | Budin et al. . |
| 5,329,525 | 7/1994 | Sakagami ............... 340/825.5 |
| 5,402,115 | 3/1995 | Tanaka .................. 340/825.25 |
| 5,452,291 | 9/1995 | Eisenhandler et al. ... 340/825.24 |
| 5,457,446 | 10/1995 | Yamamoto .............. 340/825.25 |
| 5,475,835 | 12/1995 | Hickey .................. 340/825.24 |
| 5,550,979 | 8/1996 | Tanaka et al. .......... 395/200.05 |
| 5,594,907 | 1/1997 | Tanaka .................. 340/825.5 |

FOREIGN PATENT DOCUMENTS

| | | |
|---|---|---|
| 0197768 | 10/1986 | European Pat. Off. . |
| 0395097 | 10/1990 | European Pat. Off. . |
| 0511795 | 11/1992 | European Pat. Off. . |
| 63-157202 | 6/1988 | Japan . |

OTHER PUBLICATIONS

Mitchell, R.L., "Low Cost Multiple Access Networks realized by a High performance Microcontroller", In Wescon Electronic Show and Convention Record, San Francisco, CA, Nov. 8–11, 1983, Electron Conventions Pub.: Los Angeles, CA (1984).

*Primary Examiner*—Mark H. Rinehart
*Attorney, Agent, or Firm*—Jay H. Maioli

[57] ABSTRACT

An AV system requiring the setting of only the apparatus that acts as the AV center of the system when the system configuration is to be modified. The apparatus desired to be used as the new AV center issues a command to the existing AV center telling it to become a sub AV center.

6 Claims, 38 Drawing Sheets

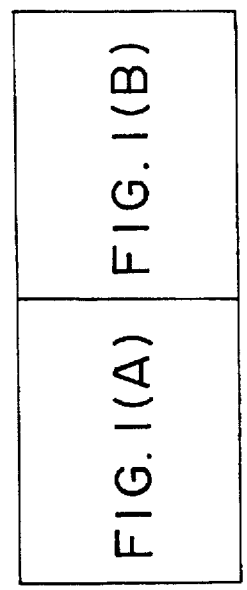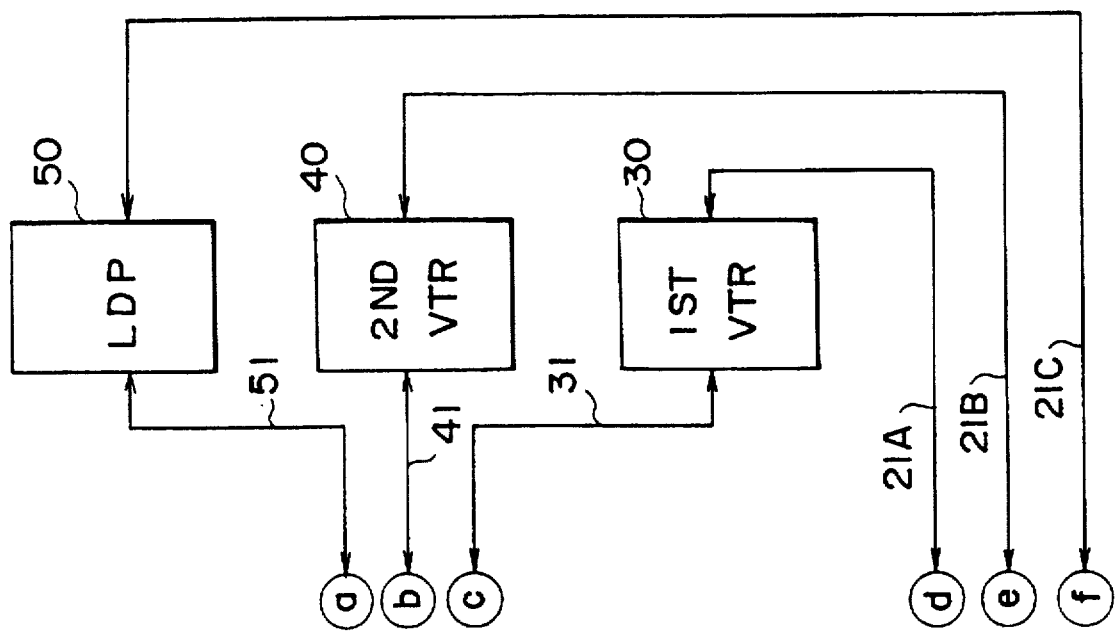
FIG. I(B)

FIG. 2

```
PLNO    PLNO NM ADR  SIG
------------------------------------------------
1-I/O---1-VTR1 120H COMPOSITE VIDEO→BS AUDIO
2-I/O---1-VTR2 121H
3-I-----1-LDP  130H
```

NM: NAME
(DEVICE NAME)
PLON:
AV PLUG No.
I/O: INPUT/OUTPUT
ADR: ADDRESS
SIG: CONTENTS

FIG. 3

```
PLNO    PLNO NM ADR  SIG           (EXTNP) (PLNO)(NM)(ADR)(SIG)
------------------------------------------------------------------
1-I/O---1-VTR1 120H CVBS/A-AUDIO ( 2-I/O----1--VTR3 122H CV/AU)
2-I/O---1-VTR2 121H
3-I-----1-LDP  130H
4-(POINTER TO EXT-AUXILIARY AV CENTER INFORMATION TABLE)
```

FIG. 4

```
PLNO    PLNO NM ADR  SIG           (EXTNP) (PLNO)(NM)(ADR)(SIG)
------------------------------------------------------------------
1-I/O---1-VTR1 120H CVBS/A-AUDIO ( 2-I/O----1--VTR3 122H CV/AU)
2-I/O---1-VTR2 121H                           (POINTER TO LOWER-LAYER SIP)
3-I-----1-LDP  130H
4-(POINTER TO EXT-AUXILIARY AV CENTER INFORMATION TABLE)
```

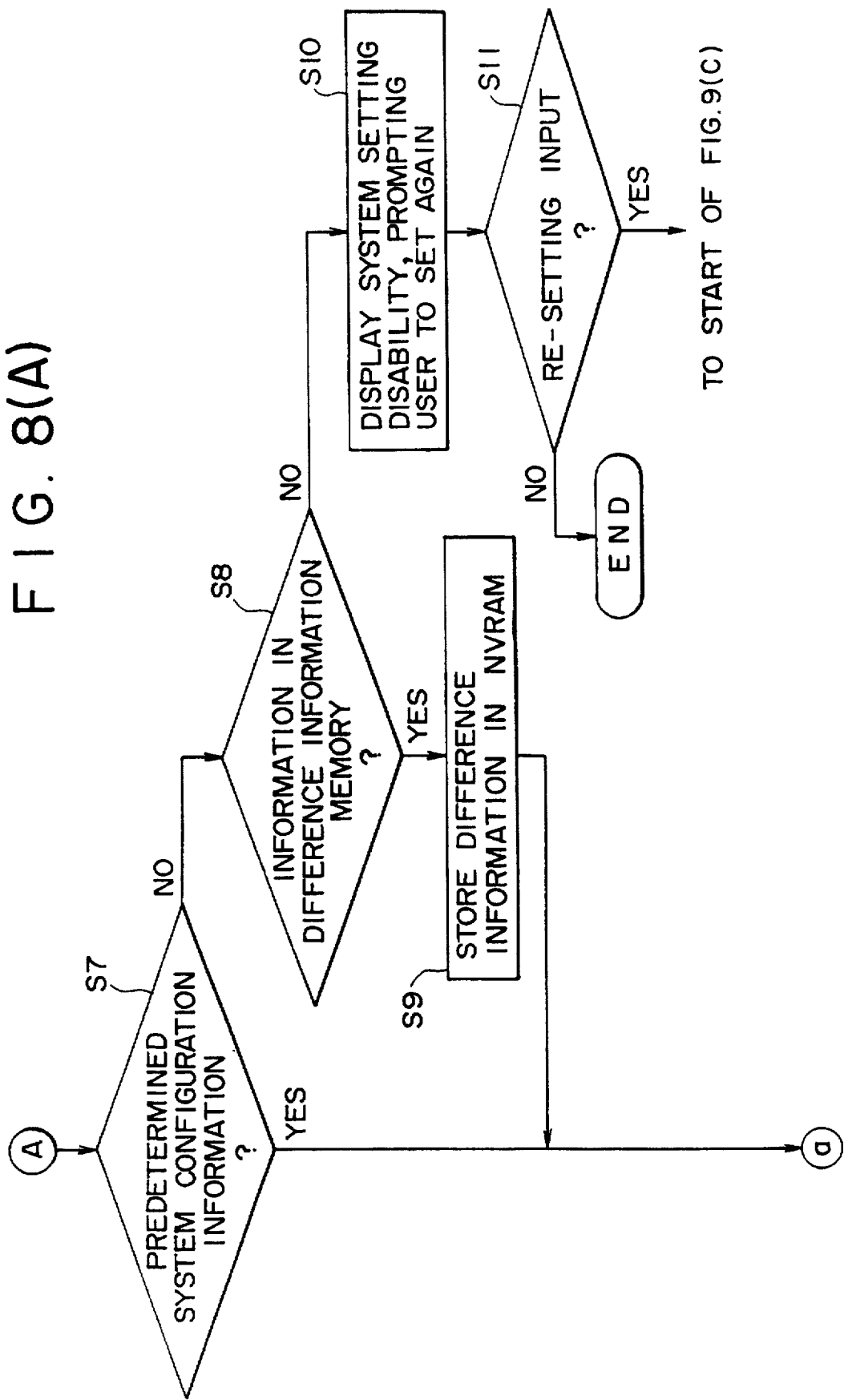

| FIG.8(A) |
| FIG.8(B) |
| FIG.8(C) |

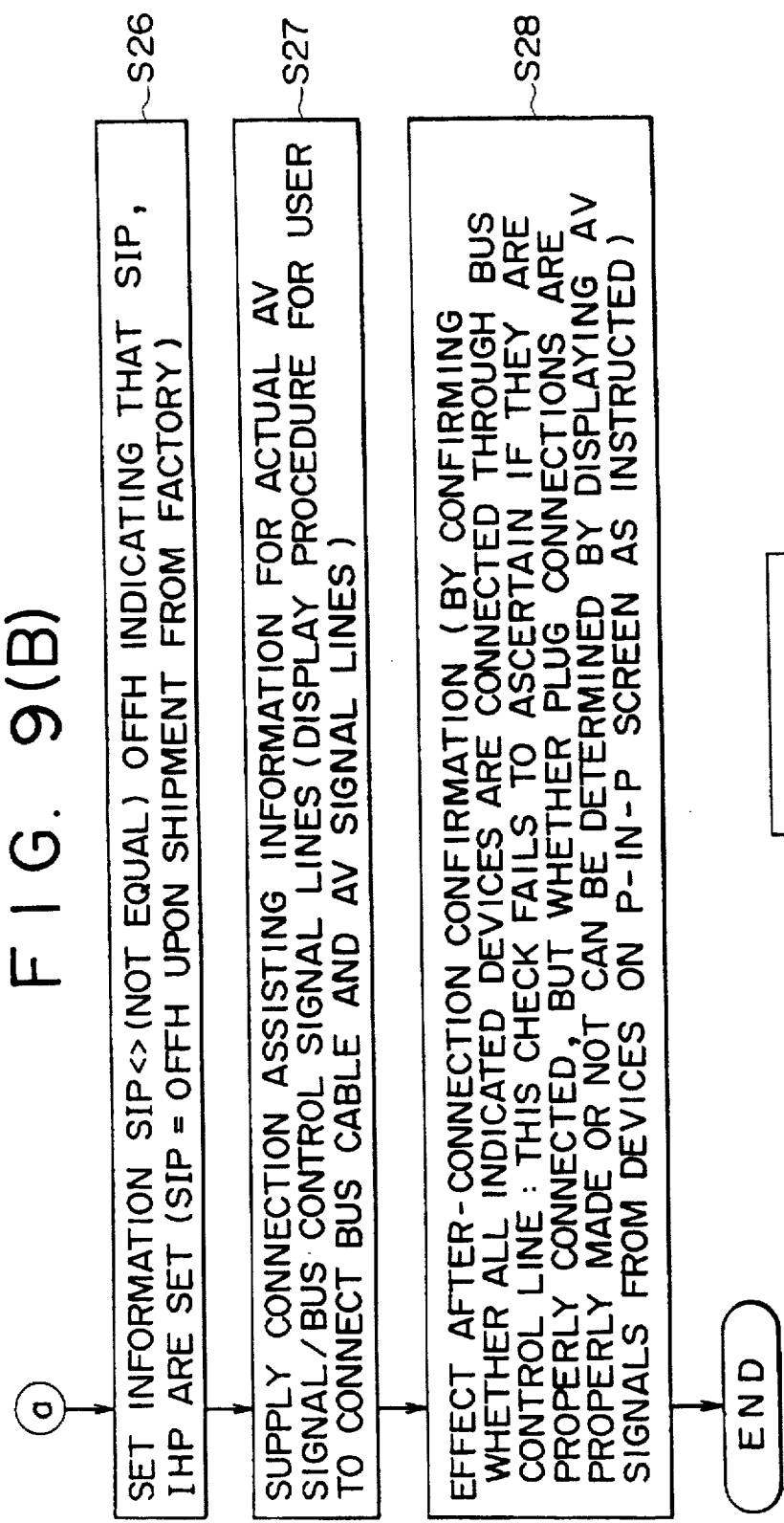

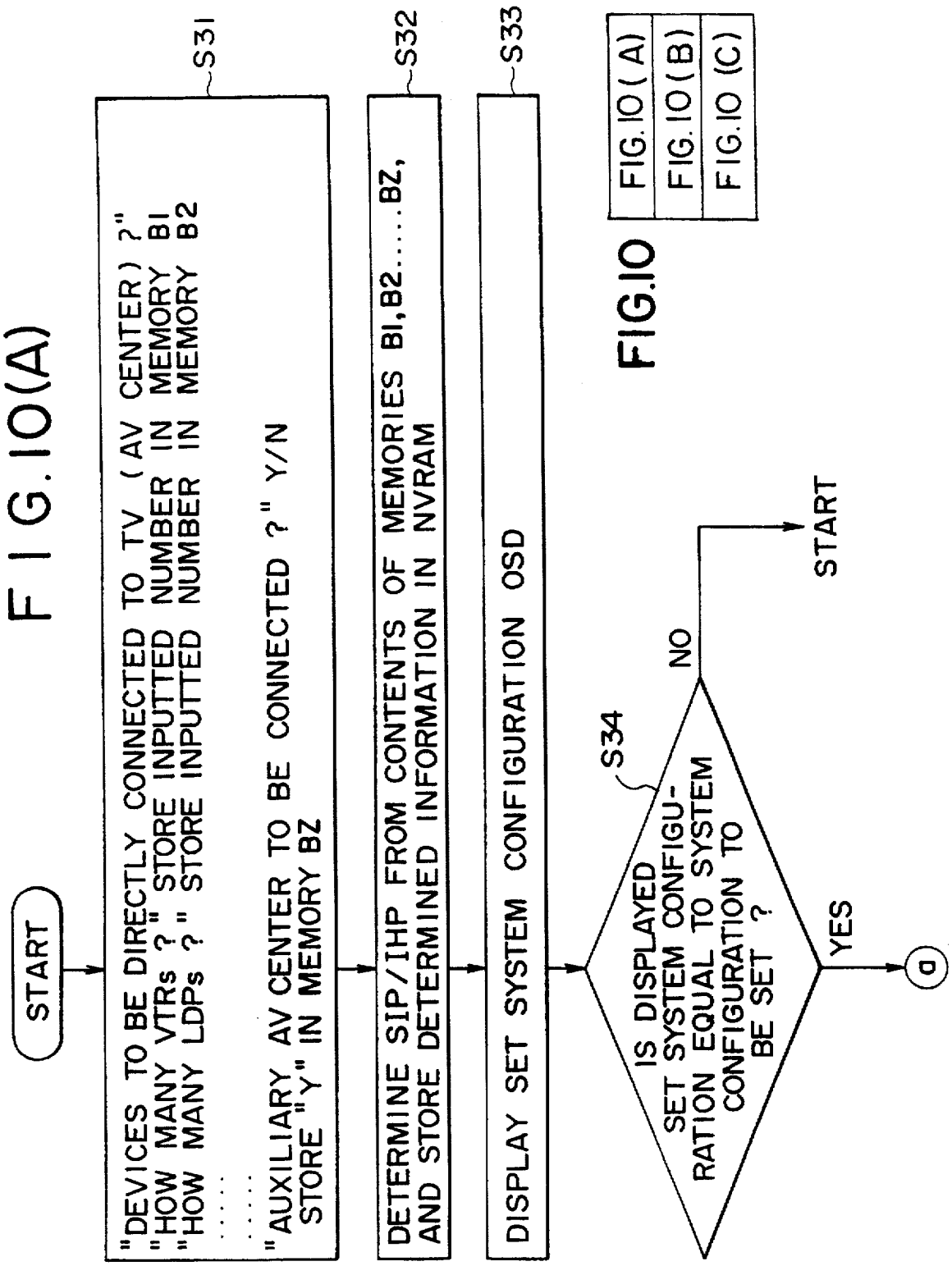

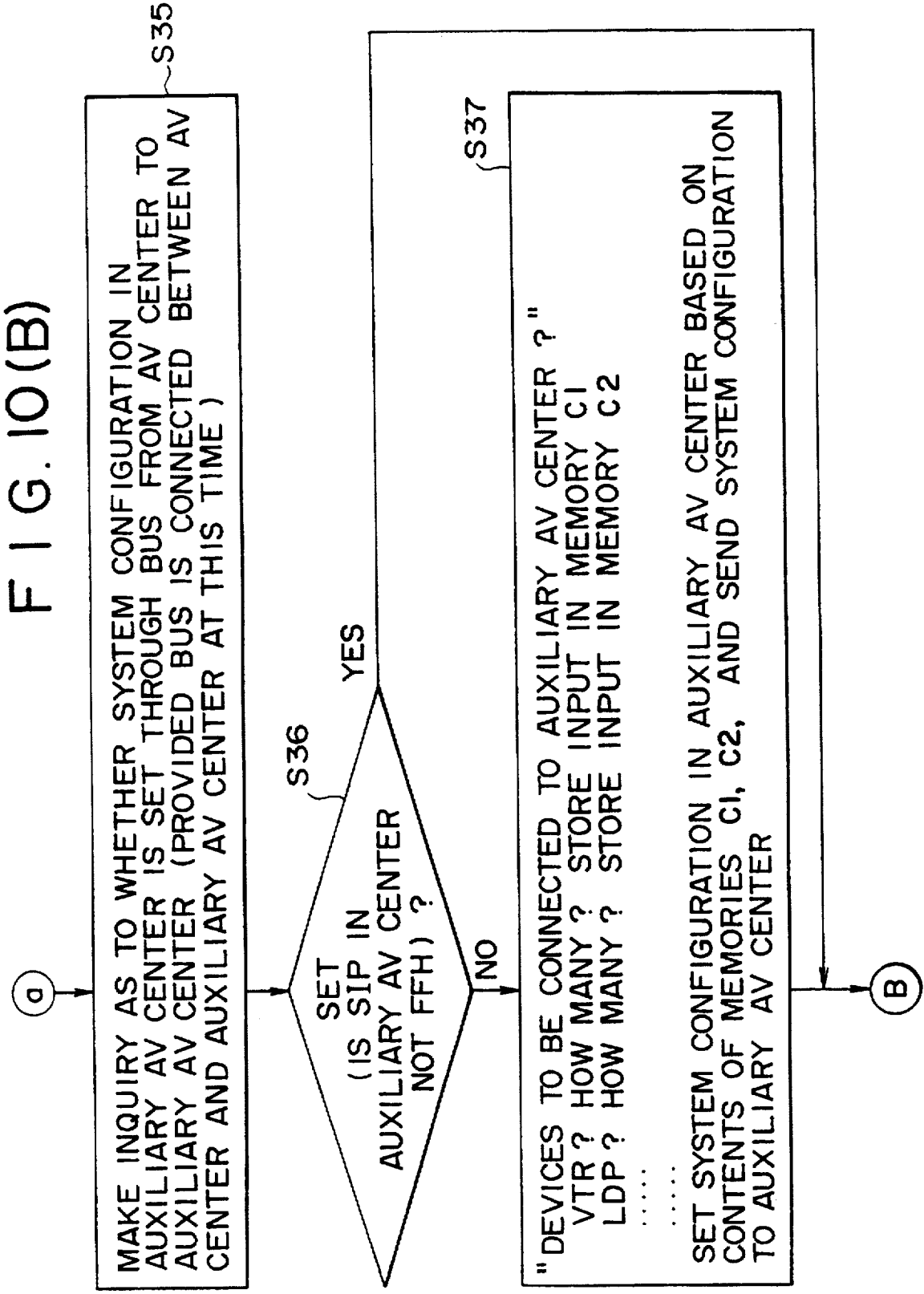

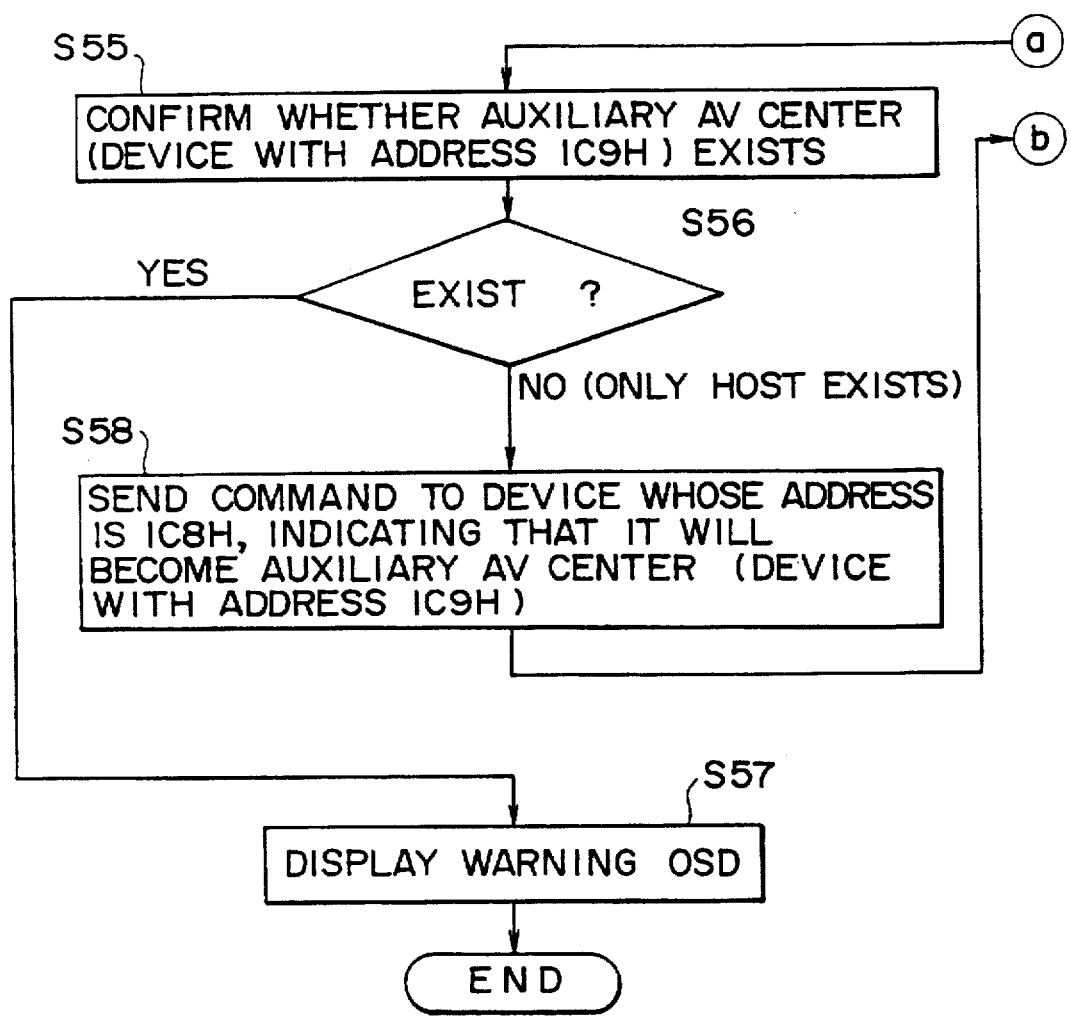

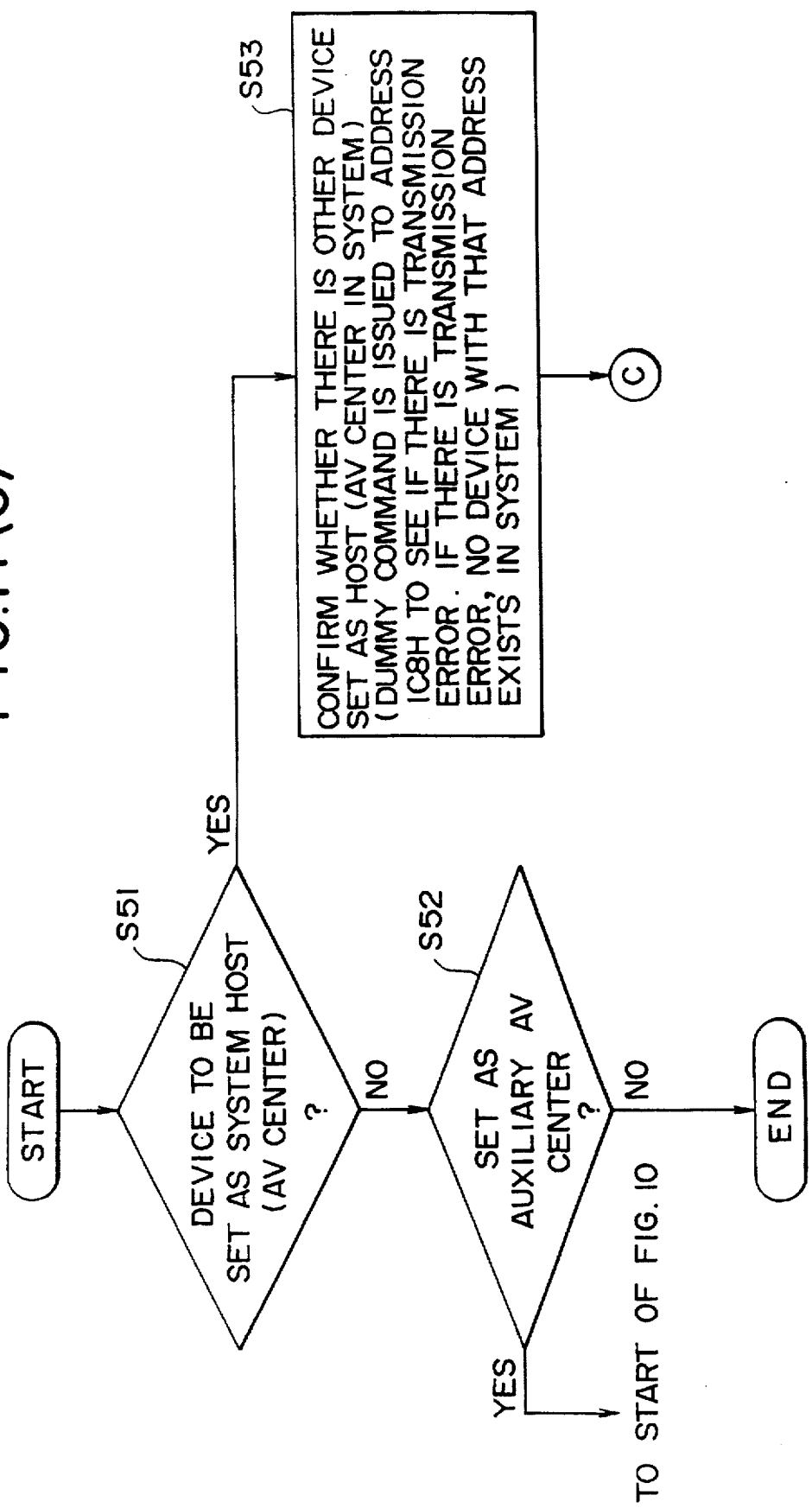

FIG. 12(A)

START

SELECT UP TO 1ST LAYER
"DEVICES TO BE DIRECTLY CONNECTED TO TV (AV CENTER) ?"
"HOW MANY VTRs ?" STORE INPUTTED NUMBER IN MEMORY B1
"HOW MANY LDPs ?" STORE INPUTTED NUMBER IN MEMORY B2
......
"OTHER AV CENTER TO BE CONNECTED ?" STORE Y/N IN MEMORY BZ
— S71

SET ACTUAL SYSTEM CONFIGURATION FROM CONTENTS OF MEMORIES B1,B2,...,BZ AND END SYSTEM SETTING FOR 1ST LAYER
— S72

SETTING OF 2ND LAYER
"DEVICES TO BE CONNECTED TO 1ST VTR ?"
VTR ? HOW MANY ? STORE INPUT IN MEMORY A1
LDP ? HOW MANY ? STORE INPUT IN MEMORY A2
......
"DEVICES TO BE CONNECTED TO 2ND VTR ?"
VTR ? HOW MANY ? STORE INPUT IN MEMORY A3
LDP ? HOW MANY ? STORE INPUT IN MEMORY A4
......
— S73

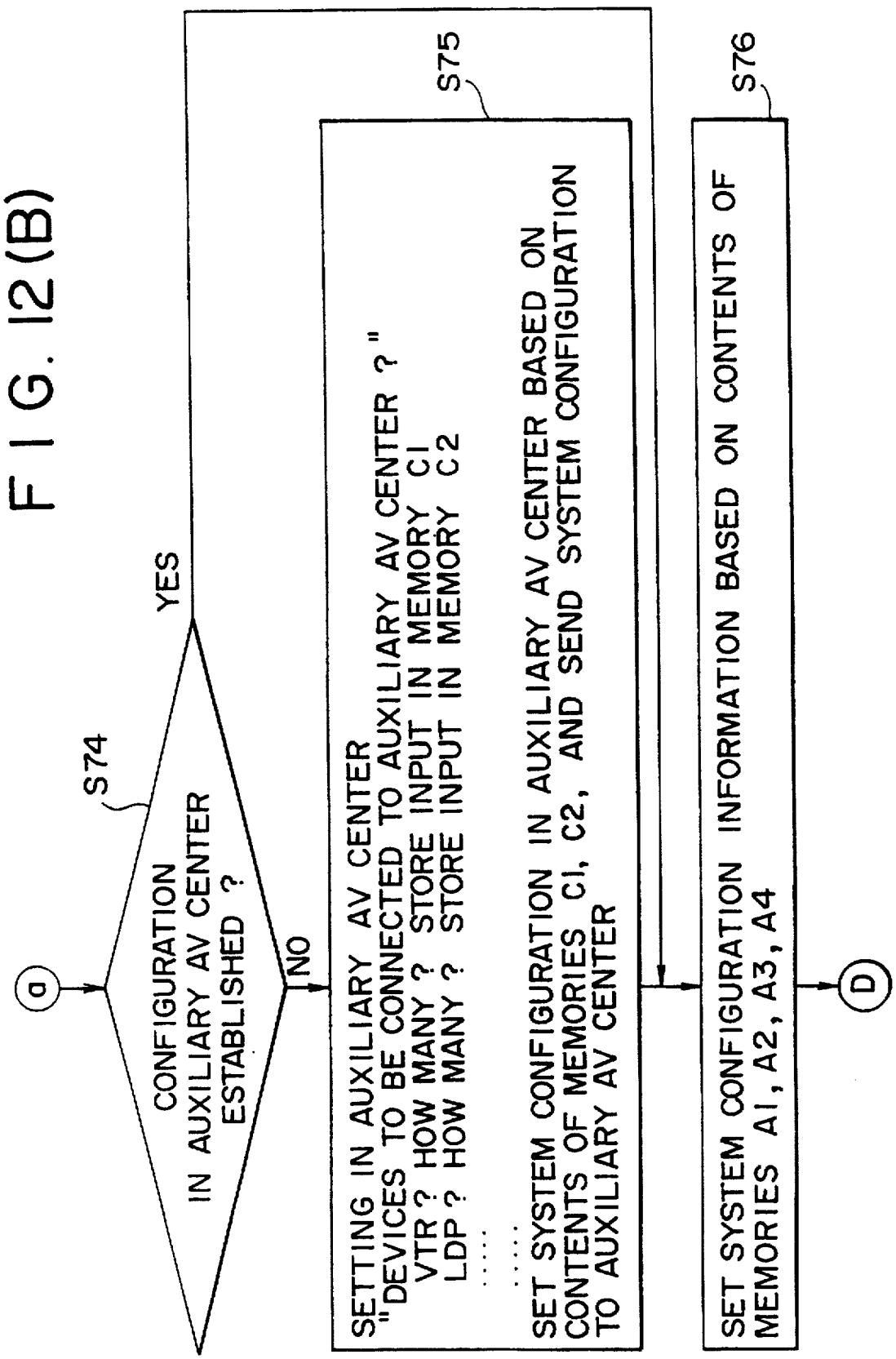

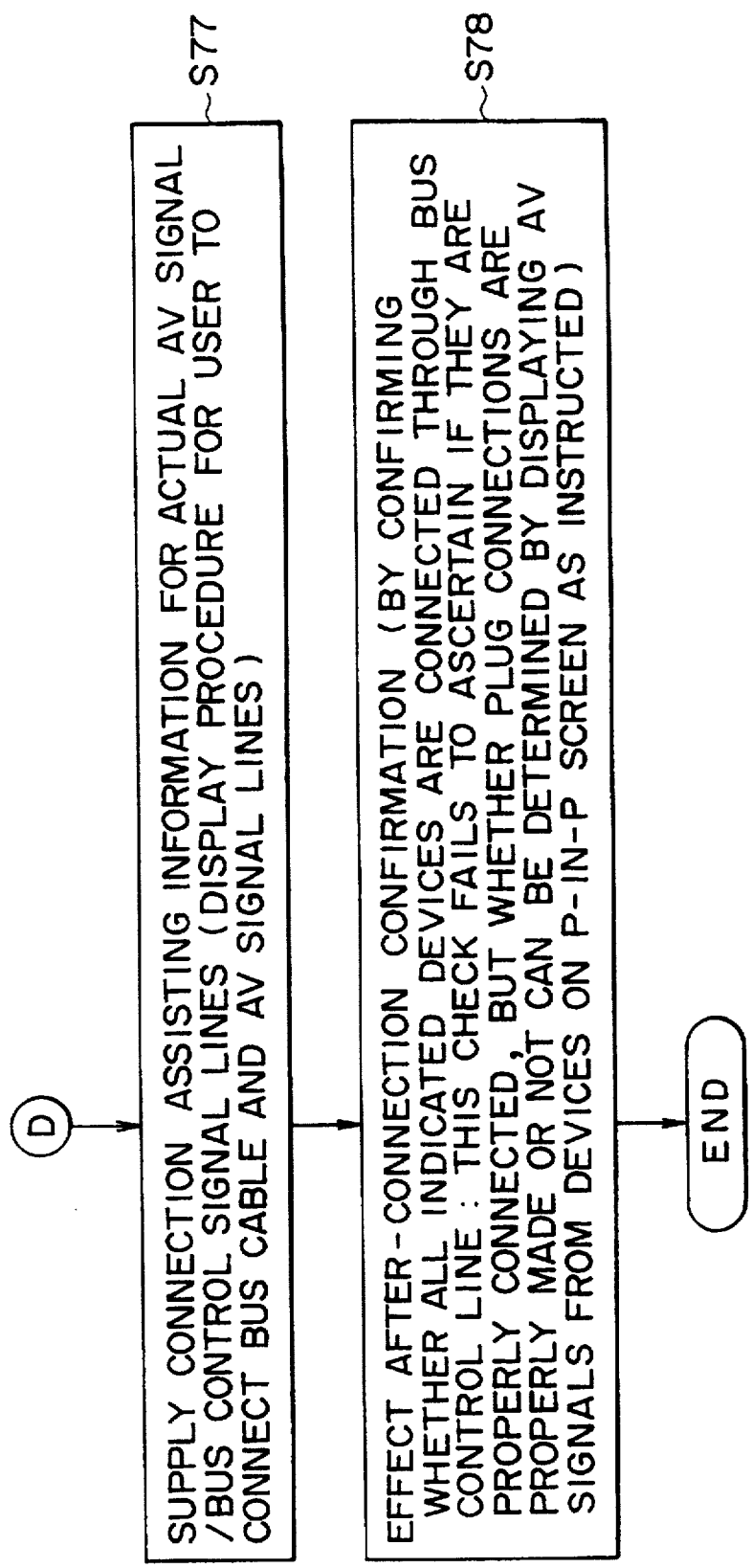

F I G. 13(A)
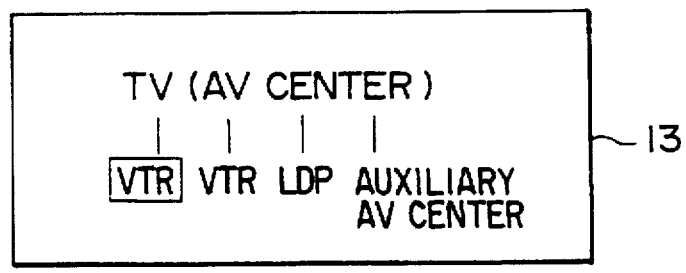
F I G. 13(B)
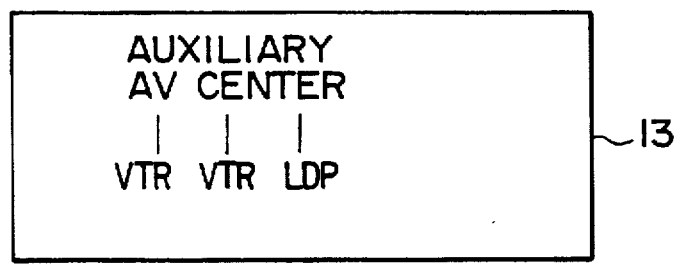
F I G. 13(C)
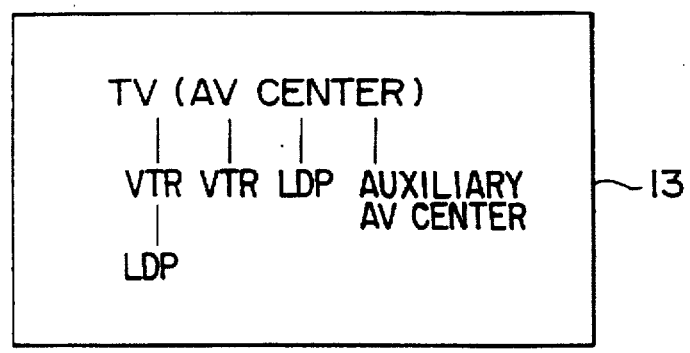

FIG. 15

| NUMBER OF PLUGS | P1 | P2 | P3 | P4 | SIPNO | IHP |
|---|---|---|---|---|---|---|
| TV(1)/VTR1 | | | | | 09 | FEH |
| TV(1)/ | | | | LDP | 09 | F7H |
| TV(2)/VTR1 | VTR2 | | | | 09 | FCH |
| TV(2)/VTR1 | | | | LDP | 09 | F6H |
| TV(3)/VTR1 | VTR2 | | | LDP | 09 | F4H |
| TV(3)/VTR1 | VTR2 | VTR3 | | | 09 | F8H |
| TV(4)/VTR1 | VTR2 | VTR3 | LDP | | 09 | F0H |

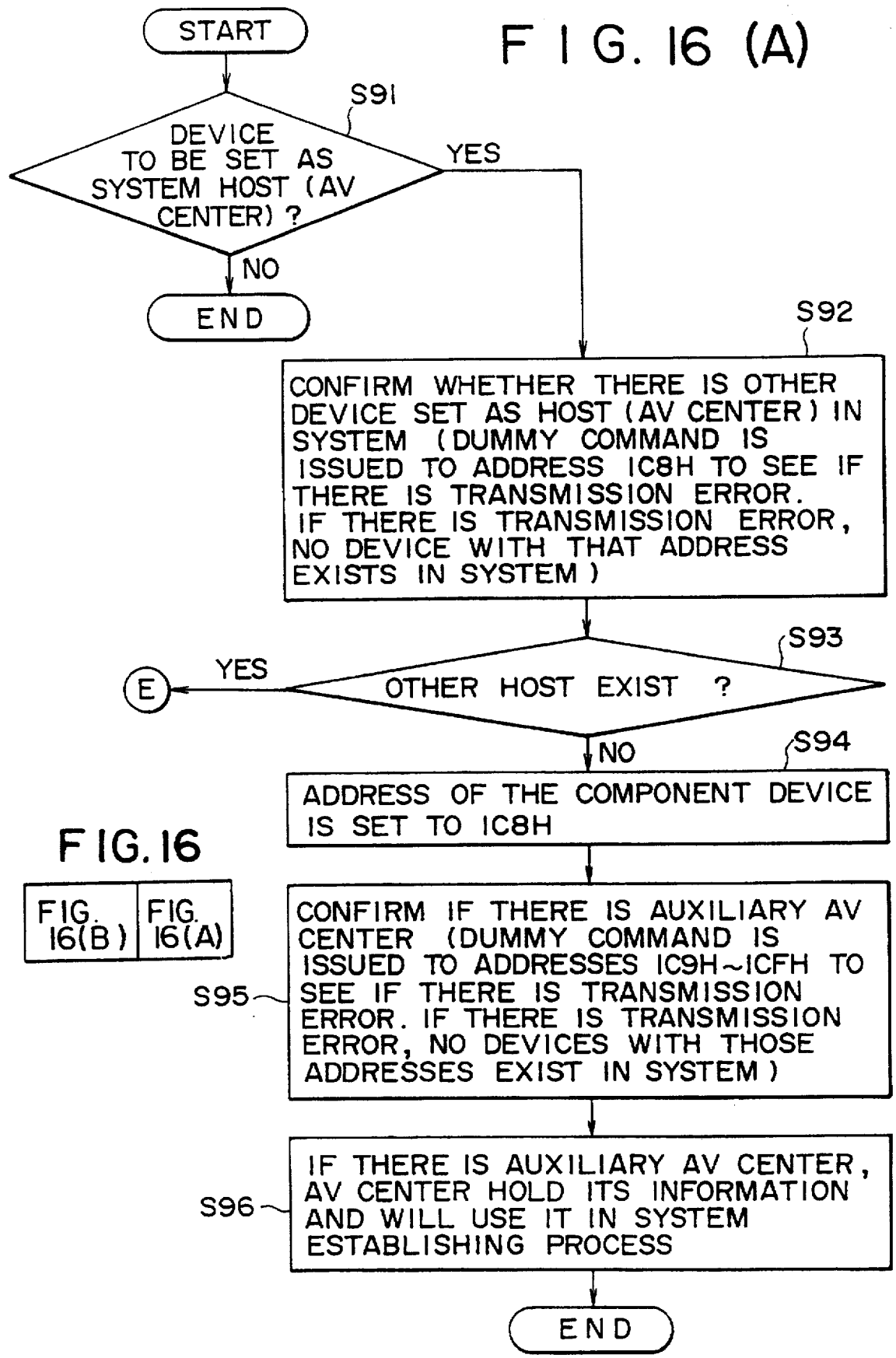

FIG. 17

| SIPNO | | TV(PLG) | VTR | LDP | AAMP | VTUNER | SUBAVCENTER |
|---|---|---|---|---|---|---|---|
| | (AV CENTER) | | | | | | |
| N01 | TV/VTR | 1(1) | 1 | | | | |
| N02 | TV/LDP | 1(1) | | 1 | | | |
| N03 | TV/VTR1/VTR2 | 1(2) | 2 | | | | |
| N04 | TV/VTR/LDP | 1(2) | 1 | 1 | | | |
| [N05] | TV/VTR1/VTR2/LDP | 1(3) | 2 | 1 | | | |
| *N06 | TV/VTR1/VTR2/LDP | 1(2) | 2 | 1 | | | |
| N07 | TV/VTR1/VTR2/VTR3 | 1(3) | 3 | | | | |
| *N08 | TV/VTR1/VTR2/VTR3 | 1(2) | 3 | | | | |
| [N09] | TV/VTR1/VTR2/VTR3/LDP | 1(4) | 3 | 1 | | | |
| | | | | | | | |
| N021 | TV/VTR/A-AMP | 1(2) | 1 | | 1 | | |
| N022 | TV/LDP/A-AMP | 1(2) | | 1 | 1 | | |
| N023 | TV/VTR1/VTR2/A-AMP | 1(3) | 2 | | 1 | | |
| N024 | TV/VTR/LDP/A-AMP | 1(3) | 1 | 1 | 1 | | |
| [N025] | TV/VTR1/VTR2/LDP/A-AMP | 1(4) | 2 | 1 | 1 | | |
| N027 | TV/VTR1/VTR2/VTR3/A-AMP | 1(4) | 3 | | 1 | | |
| [N029] | TV/VTR1/VTR2/VTR3/LDP/AAMP | 1(5) | 3 | 1 | 1 | | |
| | | | | | | | |
| N031 | TV/VTR/MAGETUNER(VU/BS/CS) | 1(2) | 1 | | | 1 | |
| N032 | TV/LDP/VTUNER(VU/BS/CS) | 1(2) | | 1 | | 1 | |
| N033 | TV/VTR1/VTR2/VTUNER | 1(3) | 2 | | | 1 | |
| N034 | TV/VTR/LDP/VTUNER | 1(3) | 1 | 1 | | 1 | |
| [N035] | TV/VTR1/VTR2/LDP/VTUNER | 1(4) | 2 | 1 | | 1 | |
| N037 | TV/VTR1/VTR2/VTR3/VTUNER | 1(4) | 3 | | | 1 | |
| [N039] | TV/VTR1/VTR2/VTR3/LDP/TNER | 1(5) | 3 | 1 | | 1 | |
| | | | | | | | |
| N041 | TV/VTR/AAMP/VTUNER | 1(3) | 1 | | 1 | 1 | |
| N042 | TV/LDP/AAMP/VTUNER | 1(3) | | 1 | 1 | 1 | |
| N043 | TV/VTR1/VTR2/AAMP/VTUNER | 1(4) | 2 | | 1 | 1 | |
| N044 | TV/VTR/LDP/AAMP/VTUNER | 1(4) | 1 | 1 | 1 | 1 | |
| [N045] | TV/VTR1/VTR2/LDP/AAMP/VTNR | 1(5) | 2 | 1 | 1 | 1 | |
| N047 | TV/VTR1/VTR2/VTR3/AMP/VTU | 1(5) | 3 | | 1 | 1 | |
| [N049] | TV/VTR1/VTR2/VTR3/LD/AMP/T | 1(6) | 3 | 1 | 1 | 1 | |

FIG. 18

|  | (AV CENTER) AMP(PLG) | TDECK | CD | AVTUNER | SUBAVCENTER |
|---|---|---|---|---|---|
| N051 AVAMP/TDECK | (1) | 1 | | | |
| N052 AVAMP/CD | (1) | | 1 | | |
| N053 AVAMP/TDECK/CD | (2) | 1 | 1 | | |
| N054 AVAMP/TDECK/AVTUNER | (2) | 1 | | 1 | |
| [N055] AVAMP/TDECK/CD/AVTUNER | (3) | 1 | 1 | 1 | |
| [N059] AVAMP/TDECK/TDECK/CD/AVTUNER | (4) | 2 | 1 | 1 | |

FIG. 19

| | (AV CENTER) TV(PLG) | VTR | LDP | AAMP | VTUNER | SUBAVCENTER |
|---|---|---|---|---|---|---|
| N0101 TV/VTR/SUB | 1(1) | 1 | | | | 1 |
| N0102 TV/LDP/SUB | 1(2) | | 1 | | | 1 |
| N0103 TV/VTR1/VTR2/SUB | 1(3) | 2 | | | | 1 |
| N0104 TV/VTR/LDP/SUB | 1(3) | 1 | 1 | | | 1 |
| [N0105]TV/VTR1/VTR2/LDP/SUB | 1(4) | 2 | 1 | | | 1 |
| *N0106 TV/VTR1/VTR2/LDP | 1(3) | 2 | 1 | | | 1 |
| N0107 TV/VTR1/VTR2/VTR3/SUB | 1(4) | 3 | | | | 1 |
| *N0108 TV/VTR1/VTR2/VTR3/SUB | 1(3) | 3 | | | | 1 |
| [N0109]TV/VTR1/VTR2/VTR3/LDP/SUB | 1(5) | 3 | 1 | | | 1 |
| N0121 TV/VTR/A-AMP(SUB) | 1(2) | 1 | | | | 1 |
| N0122 TV/LDP/A-AMP(SUB) | 1(2) | | 1 | | | 1 |
| N0123 TV/VTR1/VTR2/A-AMP(SUB) | 1(3) | 2 | | | | 1 |
| N0124 TV/VTR/LDP/A-AMP(SUB) | 1(3) | 1 | 1 | | | 1 |
| [N0125]TV/VTR1/VTR2/LDP/AAMP(SUB) | 1(4) | 2 | 1 | | | 1 |
| N0127 TV/VTR1/VTR2/VTR3/AAMP(SUB) | 1(4) | 3 | | | | 1 |
| [N0129]TV/VTR1/VTR2/VTR3/LDP/AAMP(SUB) | 1(5) | 3 | 1 | | | 1 |
| N0131 TV/VTR/IMAGETUNER/SUB | 1(3) | 1 | | | 1 | 1 |
| N0132 TV/LDP/VTUNER/SUB | 1(3) | | 1 | | 1 | 1 |
| N0133 TV/VTR1/VTR2/VTUNER/SUB | 1(4) | 2 | | | 1 | 1 |
| N0134 TV/VTR/LDP/VTUNER/SUB | 1(4) | 1 | 1 | | 1 | 1 |
| [N0135]TV/VTR1/VTR2/LDP/VTUNER/S | 1(5) | 2 | 1 | | 1 | 1 |
| N0137 TV/VTR1/VTR2/VTR3/TUNER/S | 1(5) | 3 | | | 1 | 1 |
| [N0139]TV/VR1/VR2/VR3/LDP/TNR/SUB | 1(6) | 3 | 1 | | 1 | 1 |
| N0141 TV/VTR/AAMP/VTUNER/SUB | 1(4) | 1 | | 1 | 1 | 1 |
| N0142 TV/LDP/AAMP/VTUNER/SUB | 1(4) | | 1 | 1 | 1 | 1 |
| N0143 TV/VTR1/VTR2/AAMP/TNR/SUB | 1(5) | 2 | | 1 | 1 | 1 |
| N0144 TV/VTR/LDP/AAMP/TNR/SUB | 1(5) | 1 | 1 | 1 | 1 | 1 |
| [N0145]TV/VR1/VR2/LDP/AAMP/TNR/S | 1(6) | 2 | 1 | 1 | 1 | 1 |
| N0147 TV/VR1/VR2/VR3/AMP/TU/SUB | 1(6) | 3 | | 1 | 1 | 1 |
| [N0149]TV/VR1/VR2/VR3/LD/AMP/TU/S | 1(7) | 3 | 1 | 1 | 1 | 1 |

F I G. 20

```
                           (AV CENTER)
                           AMP(PLG) TDECK CD AVTUNER SUBAVCENTER
-----------------------------------------------------------------
 NO151 AVAMP/TDECK/SUBAVCENTER      (2)    1                1
 NO152 AVAMP/CD/SUB                 (2)       1             1
 NO153 AVAMP/TDECK/CD/SUB           (3)    1  1             1
 NO154 AVAMP/TDECK/AVTUNER/SUB      (3)    1       1        1
[NO155]AVAMP/TDECK/CD/AVTUNER/SUB   (4)    1  1    1        1
[NO159]AVAMP/TDECK/TDECK/CD/TNR/SUB (5)    2  1    1        1
```

FIG. 21
N01 TV/VTR
N02 TV/LDP
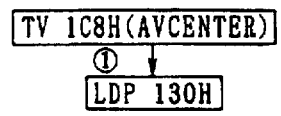
N03 TV/VTR1/VTR2
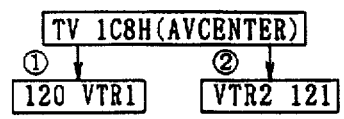
N04 TV/VTR/LDP
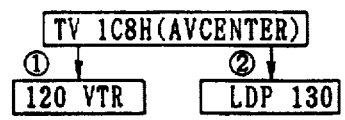
N05 TV/VTR1/VTR2/LDP
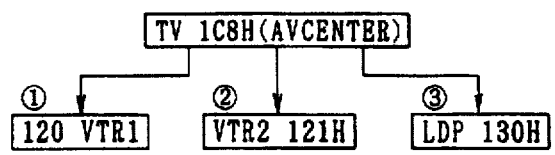
N06 TV/VTR1/VTR2/LDP
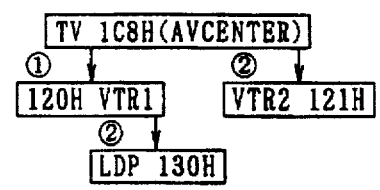
N07 TV/VTR1/VTR2/VTR3
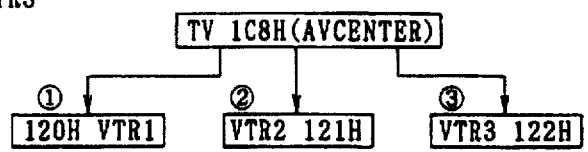
N08 TV/VTR1/VTR2/VTR3
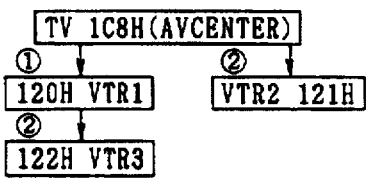
N09 TV/VTR1/VTR2/VTR3/LDP
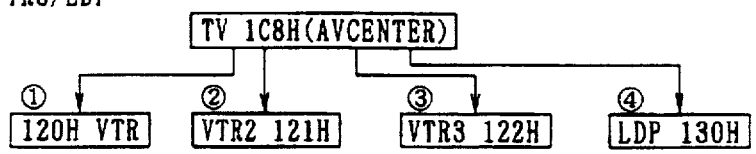

F I G. 22
NO21 TV/VTR/A-AMP
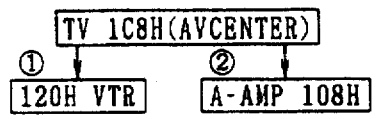
NO22 TV/LDP/A-AMP
NO23 TV/VTR1/VTR2/A-AMP
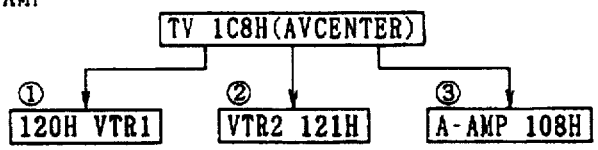
NO24 TV/VTR/LDP/A-AMP
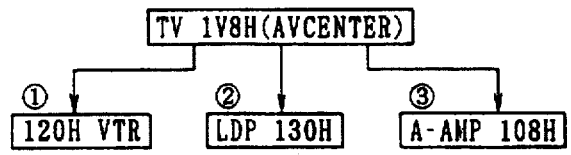
NO25 TV/VTR1/VTR2/LDP/A-AMP
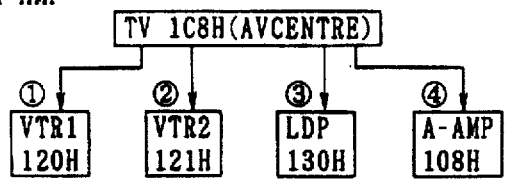
NO27 TV/VTR1/VTR2/VTR3/A-AMP
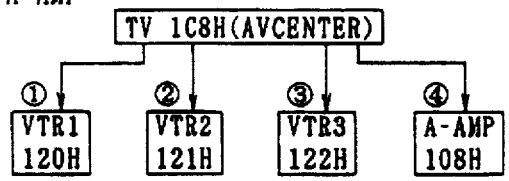
NO29 TV/VTR1/VTR2/VTR3/LDP/A-AMP
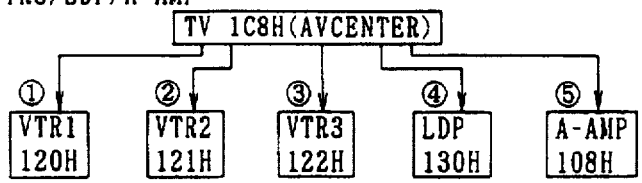

FIG. 23
N031 TV/VTR/VIDEO-TUNER
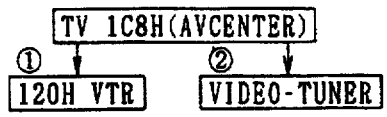
N032 TV/LDP/VIDEO-TUNER
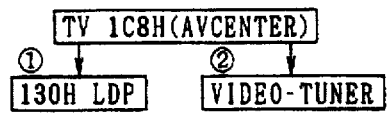
N033 TV/VTR1/VTR2/VIDEO-TUNER
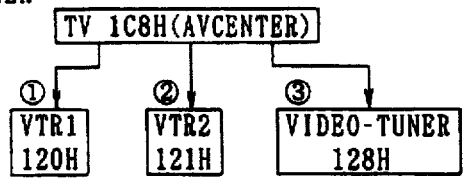
N034 TV/VTR/LDP/VIDEO-TUNER
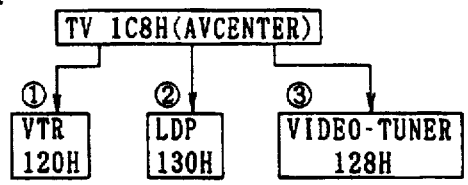
N035 TV/VTR1/VTR2/LDP/VIDEO-TUNER
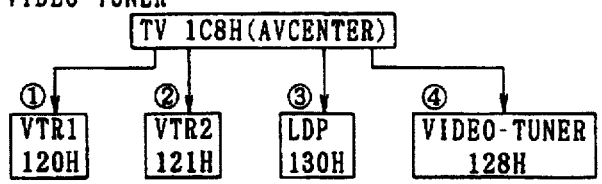
N037 TV/VTR1/VTR2/VTR3/VIDEO-TUNER
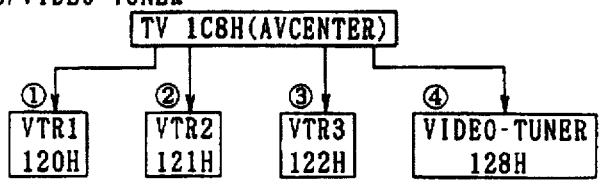
N039 TV/VTR1/VTR2/VTR3/LDP/VIDEO-TUNER
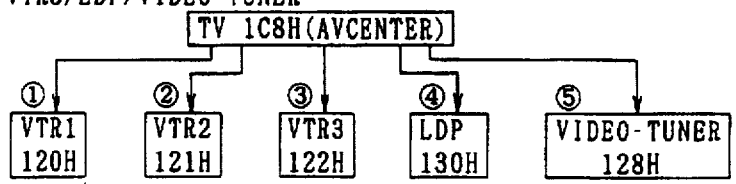

FIG. 24
N041 TV/VTR/AAMP/VTUNER
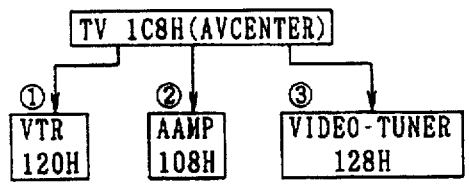
N042 TV/LDP/AAMP/VTUNER
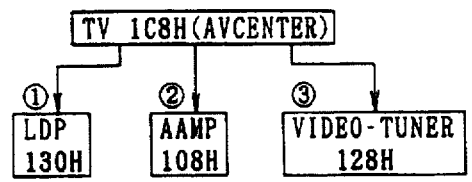
N043 TV/VTR1/VTR2/AAMP/VTUNER
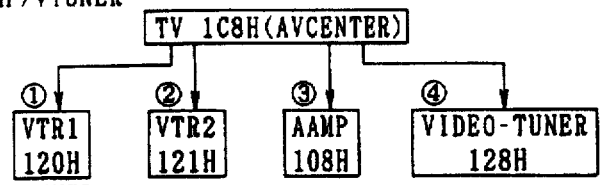
N044 TV/VTR/LDP/AAMP/VTUNER
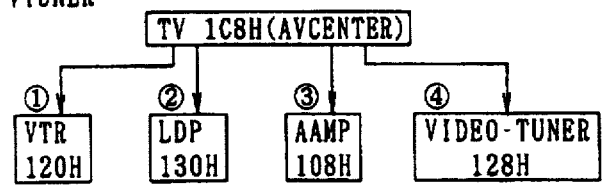
N045 TV/VTR1/VTR2/LDP/AAMP/VTNR
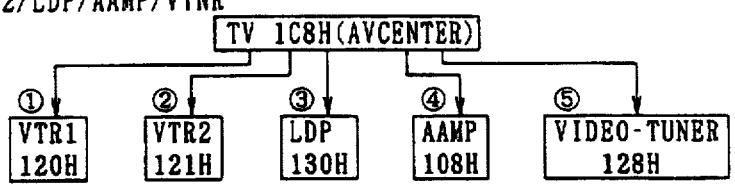
N047 TV/VTR1/VTR2/VTR3/AMP/VTU
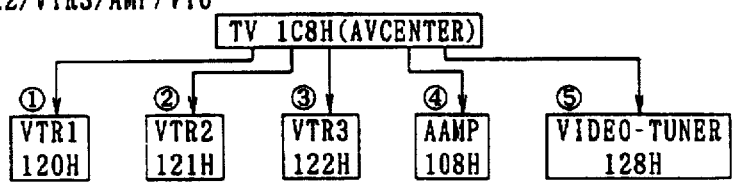
N049 TV/VTR1/VTR2/VTR3/LD/AMP/TU
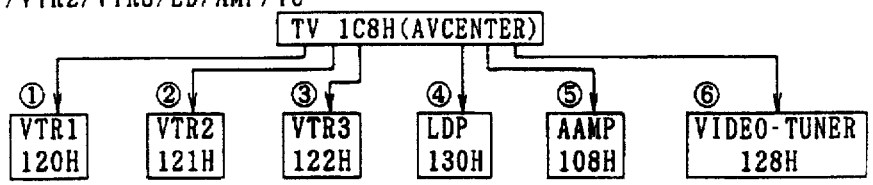

FIG. 25
NO51 AVAMP/TAPEDECK
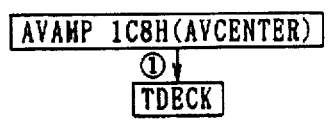
NO52 AVAMP/CD
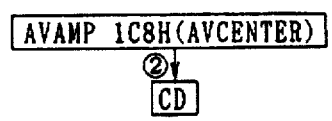
NO53 AVAMP/TDECK/CD
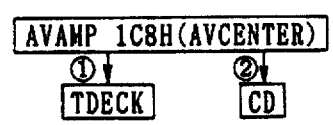
NO54 AVAMP/TDECK/AVTUNER
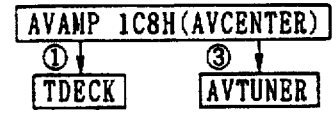
NO55 AVAMP/TDECK/CD/AVTUNER
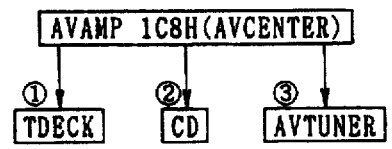
NO59 AVAMP/TDECK/TDECK/CD/AVTUNER
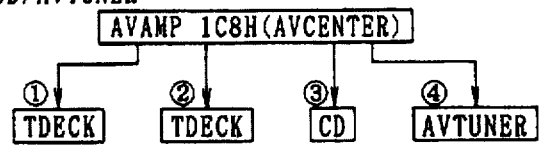

FIG. 26
NO107 TV/VTR1/VTR2/VTR3/SUBAVCENTER
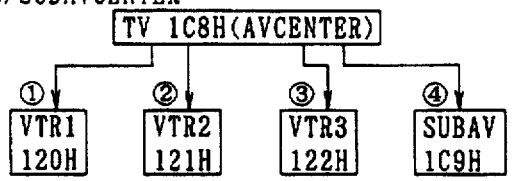
NO109 TV/VTR1/VTR2/VTR3/LDP/SUBAVCENTER
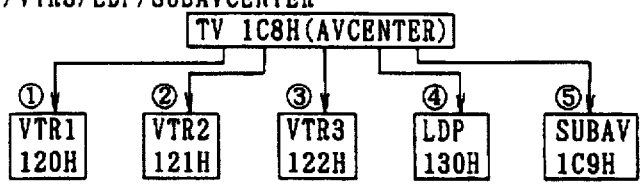
NO127 TV/VTR1/VTR2/VTR3/(A-AMP)SUBAVCENTERN        SAME AS NO107
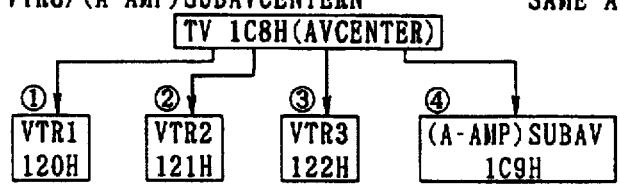
NO129 TV/VTR1/VTR2/VTR3/LDP/SUBAVCENTER        SAME AS NO109
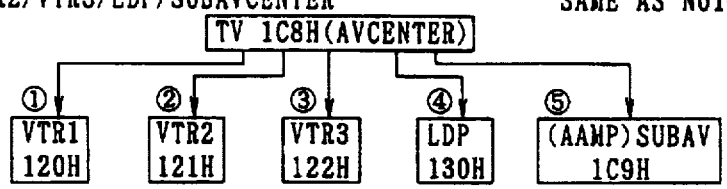
NO157 AVAMP/TDECK/CD/AVTUNER/SUBAVCENTER
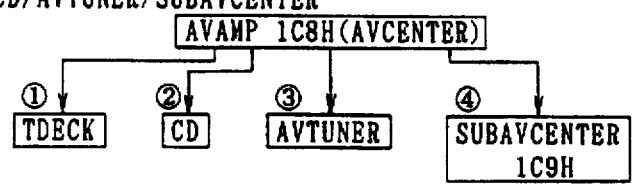
NO159 AVAMP/TDECK/TDECK/CD/AVTUNER/SUBAVCENTER
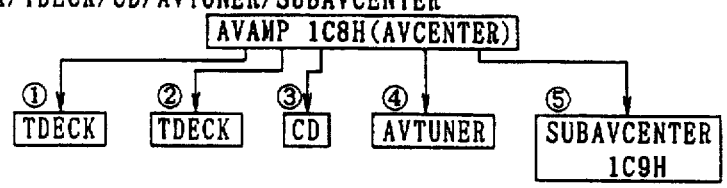

FIG. 27

|  | (AV CENTER) | | | | | |
|---|---|---|---|---|---|---|
| SIPNO | TV(PLG) | VTR | LDP | AAMP | VTUNER | SUBAVCENTER |
| [N05] TV/VTR1/VTR2/LDP | 1(3) | 2 | 1 | | | |
| *N06 TV/VTR1/VTR2/LDP | 1(2) | 2 | 1 | | | |
| *N08 TV/VTR1/VTR2/VTR3 | 1(2) | 3 | | | | |
| [N09] TV/VTR1/VTR2/VTR3/LDP | 1(4) | 3 | 1 | | | |
| [N025]TV/VTR1/VTR2/LDP/A-AMP | 1(4) | 2 | 1 | 1 | | |
| [N029]TV/VTR1/VTR2/VTR3/LDP/AAMP | 1(5) | 3 | 1 | 1 | | |
| [N035]TV/VTR1/VTR2/LDP/VTUNER | 1(4) | 2 | 1 | | 1 | |
| [N039]TV/VTR1/VTR2/VTR3/LDP/TNER | 1(5) | 3 | 1 | | 1 | |
| [N045]TV/VTR1/VTR2/LDP/AAMP/VTNR | 1(5) | 2 | 1 | 1 | 1 | |
| [N049]TV/VTR1/VTR2/VTR3/LD/AMP/T | 1(6) | 3 | 1 | 1 | 1 | |

FIG. 28

(AV CENTER)

|  | AMP(PLG) | TDECK | CD | AVTUNER | DAT | SUBAVCENTER |
|---|---|---|---|---|---|---|
| [N055] AVAMP/TDECK/CD/AVTUNER | (3) | 1 | 1 | 1 | | |
| [N059] AVAMP/TDECK/TDECK/CD/AVTUNER | (4) | 2 | 1 | 1 | | |
| N060 AVAMP/DAT=TDECK/CD/AVTUNER | (4) | 1 | 1 | 1 | 1 (DIRECTLY CONNECTED TO TAPE DECK) | |
| N061 AVAMP/DAT=TDECK/TDECK/CD/TNR | (5) | 2 | 1 | 1 | 1 (DIRECTLY CONNECTED TO TAPE DECK) | |

FIG. 29

|  | (AV CENTER) TV(PLG) | VTR | LDP | AAMP | VTUNER | SUBAVCENTER |
|---|---|---|---|---|---|---|
| [NO105]TV/VTR1/VTR2/LDP/SUB | 1(4) | 2 | 1 |  |  | 1 |
| *NO106 TV/VTR1/VTR2/LDP | 1(3) | 2 | 1 |  |  |  |
| *NO108 TV/VTR1/VTR2/VTR3/SUB | 1(3) | 3 |  |  |  | 1 |
| [NO109]TV/VTR1/VTR2/VTR3/LDP/SUB | 1(5) | 3 | 1 |  |  | 1 |
| [NO125]TV/VTR1/VTR2/LDP/AAMP(SUB) | 1(4) | 2 | 1 |  |  | 1 |
| [NO129]TV/VTR1/VTR2/VTR3/LDP/AAMP(SUB) | 1(5) | 3 | 1 |  |  | 1 |
| [NO135]TV/VTR1/VTR2/LDP/VTUNER/S | 1(5) | 2 | 1 |  | 1 | 1 |
| [NO139]TV/VR1/VR2/VR3/LDP/TNR/SUB | 1(6) | 3 | 1 |  | 1 | 1 |
| [NO145]TV/VR1/VR2/LDP/AAMP/TNR/S | 1(6) | 2 | 1 | 1 | 1 | 1 |
| [NO149]TV/VR1/VR2/VR3/LD/AMP/TU/S | 1(7) | 3 | 1 | 1 | 1 | 1 |

FIG. 30

```
                              (AV CENTER)
                          AMP(PLG)  TDECK  CD  AVTUNER  SUBAVCENTER
------------------------------------------------------------------
[NO155]AVAMP/TDECK/CD/AVTUNER/SUB    (4)     1    1      1          1
[NO159]AVAMP/TDECK/TDECK/CD/TNR/SUB  (5)     2    1      1          1

NO255 DEFINED AS "UNSET" (UPON SHIPMENT FROM FACTORY)
```

AUDIO VIDEO SYSTEM

This is a division of application Ser. No. 08/168,374 filed Dec. 17, 1993, now U.S. Pat. No. 5,550,979.

BACKGROUND OF THE INVENTION

1. Field of the Invention

The present invention relates to an audio video (AV) system.

2. Description of the Related Art

Conventional audio video (AV) systems are each composed of a video and an audio system. The video system includes a plurality of AV apparatuses such as a television (TV) set, a video tape recorder (VTR) and a laser disc player (LDP). The audio system comprises a plurality of AV apparatuses such as an amplifier, a tape recorder and a compact disc player. The video and the audio systems each have an apparatus called an AV center.

In conventional AV systems of the above constitution, connecting the audio system with the video system without proper arrangements therebetween leaves the two AV centers operating on their own. The result can be conflict between the two AV centers.

SUMMARY OF THE INVENTION

It is therefore an object of the present invention to overcome the above and other deficiencies and disadvantages of the prior art and to provide an AV system that operates normally when any apparatus in the audio system is connected to any apparatus in the video system.

It is another object of the invention to provide an AV system which, when the system configuration is to be modified, requires setting only the apparatus that acts as the AV center of the system.

It is a further object of the invention to provide an AV system which, with a limited storage capacity, allows the previous features to be executed unchanged after a new system configuration is completed.

It is an even further object of the invention to provide an AV system allowing a sub AV center to execute the features of the system even if that center does not possess system configuration information about the entire system.

In carrying out the invention and according to one aspect thereof, there is provided an audio video system with a bus line arrangement comprising a main control apparatus and a sub control apparatus. The main control apparatus includes: a first main control member for controlling the operation of a first video apparatus; a first sub control member for controlling the operation of an other apparatus through an external bus line controlled by the first main control member; a first memory member for storing a program for controlling the first main control member and/or the first sub control member; a display member for displaying the status of the first audio video apparatus and/or a command ordered by a user; a selector for selecting an audio and/or video signal supplied from an other apparatus; and a clock member for generating a clock signal for the operation of the first main control member and/or the sub control member. The sub control apparatus comprises: a second main control member for controlling the operation of a second audio video apparatus; a second sub control member for controlling the communication to and from an other apparatus and/or the main control apparatus through an external bus line controlled by the second main control member; and a second memory member for storing a program for controlling the second main control member and/or the second sub control member.

According to another aspect of the invention, there is provided a method of avoiding the conflict of controllers comprising the steps of: questioning a user whether a target apparatus is to be set as a master apparatus of a system; to receive an answer if the answer is negative, setting the target apparatus as a sub master apparatus; and if the answer is affirmative executing a checking procedure.

Other objects, features and advantages of the present invention will become apparent in the following specification and accompanying drawings.

BRIEF DESCRIPTION OF THE DRAWINGS

FIGS. 1A, 1B is a block diagram of an AV system embodying the present invention;

FIG. 2 is a view of typical system configuration information pointed to by a system information pointer (SIP) in a ROM 5A;

FIG. 3 is a view of another typical system configuration information pointed to by the SIP in the ROM 5A;

FIG. 4 is a view of another typical system configuration information pointed to by the SIP in the ROM 5A;

FIGS. 8, 8A, 8B, 8C is a flowchart of steps for setting a system configuration;

FIGS. 9, 9A, 9B is a flowchart of steps for setting an AV center using a sub AV center in such a manner that the entire system is set up simply;

FIGS. 10, 10A, 10B, 10C is a continuation to the flowchart of steps for setting a system configuration centering on the main AV center using a sub AV center in such a manner that the entire system is set up simply;

FIGS. 11, 11A, 11B, 11C is a flowchart of steps for setting an AV center;

FIGS. 12, 12A, 12B, 12C is a flowchart of steps for keeping selected system configuration information unchanged;

FIGS. 13(A)–13(C) are a set of views showing typical displays that allow the user to set a system configuration with ease;

FIG. 15 is a view depicting how the SIP and IHP (inhibit plug bit) settings are typically used;

FIGS. 16, 16A, 16B is a flowchart of steps for setting an AV center in another way;

FIG. 17 is a view showing an example of SIP settings;

FIG. 18 is a view showing another example of SIP settings;

FIG. 19 is a view showing another example of SIP settings;

FIG. 20 is a view showing another example of SIP settings;

FIG. 21 is a view of typical AV system configurations;

FIG. 22 is a view of other AV system configurations;

FIG. 23 is a view of other AV system configurations;

FIG. 24 is a view of other AV system configurations;

FIG. 25 is a view of other AV system configurations;

FIG. 26 is a view of other AV system configurations;

FIG. 27 is a view depicting another example of SIP settings;

FIG. 28 is a view depicting another example of SIP settings;

FIG. 29 is a view depicting another example of SIP settings; and

FIG. 30 is a view depicting another example of SIP settings.

DESCRIPTION OF THE PREFERRED EMBODIMENT

Figure 1A:
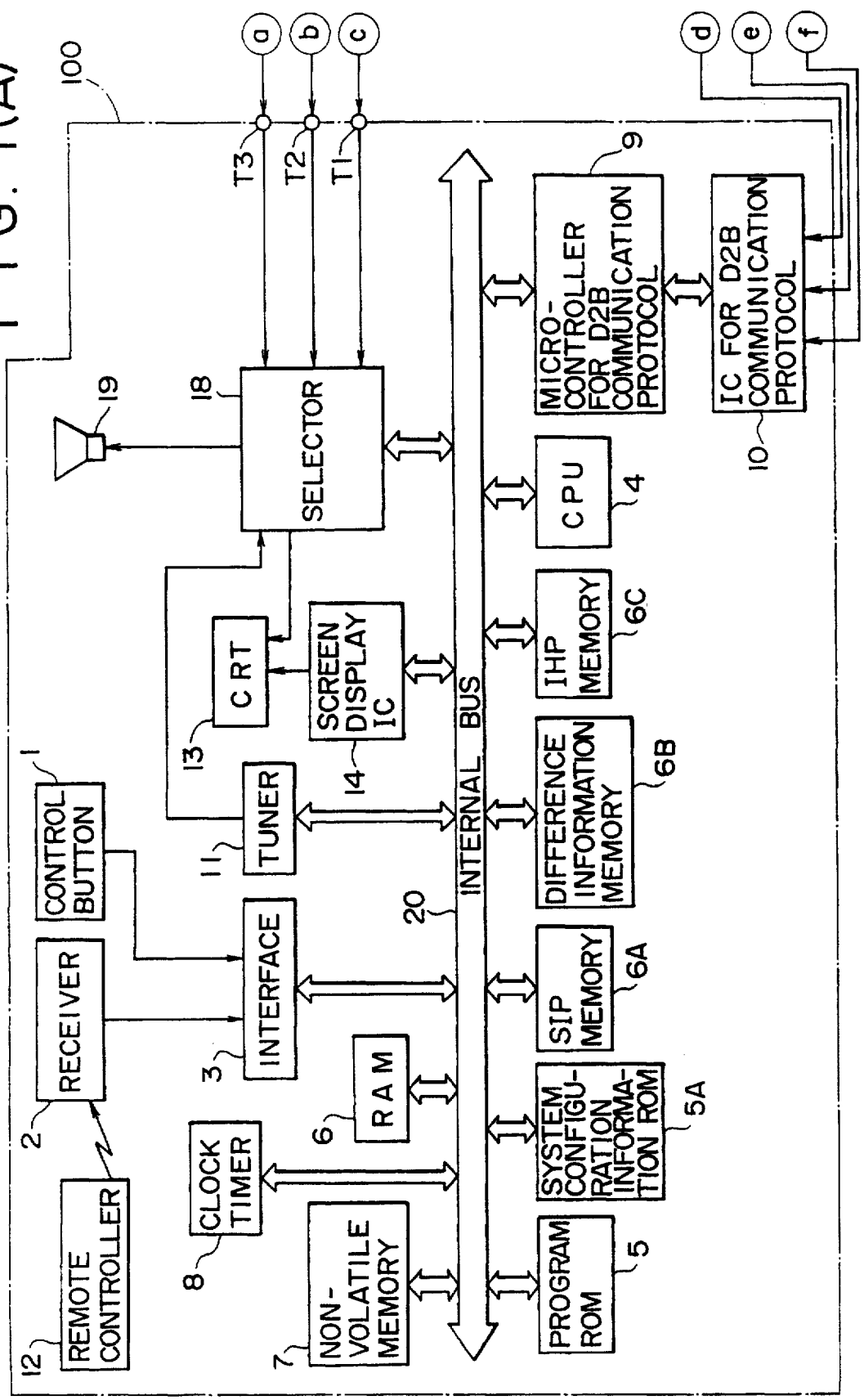

FIG. 1 is a block diagram of a typical AV system that embodies the present invention.

Pressing the control button part 1 enters appropriate commands to a CPU 4 through an interface 3 and over an internal bus 20. Likewise, operating a remote controller 12 causes it to emit infrared rays that are received by a receiver 2. Given the infrared rays, the receiver 2 transmits commands accordingly to the CPU 4 via the interface 3 and internal bus 20.

Through the internal bus 20, the CPU 4 is connected to the interface 3, a program ROM 5, a system configuration information ROM 5A, a RAM 6, a system information pointer (SIP) memory 6A, a difference information memory 6B, an inhibit plug bit (IHP) memory 6C, a non-volatile memory 7, a clock timer 8, a micro controller 9 for D2B communication protocol, a tuner 11, a screen display IC 14, and a selector 18.

On receiving the input commands, the CPU 4 executes processing of diverse kinds such as sending a tuning instruction to the tuner 11 and outputting commands to the micro controller 9 for D2B communication protocol.

The program ROM stores programs needed for the CPU 4 to operate. The RAM 6 stores data obtained from the processing of the CPU 4. The non-volatile memory 7 retains data that needs to be kept intact after power is removed, such as the connection status involving other AV apparatuses (e.g., a first video tape recorder (VTR) 30, a second VTR 40 and a laser disc player (LDP) 50). The clock timer 8 maintains timing by continuously generating clock information.

The system configuration information ROM 5A stores a plurality of pieces of information about predetermined configurations involving such AV apparatuses as a TV set 100, the VTR's 30 and 40, and the LDP 50. The SIP memory 6A stores the SIP that points to one of the predetermined configurations held in the ROM 5A. FIGS. 2, 3 and 4 show information about three typical system configurations pointed to by the SIP in the ROM 5A. The information shown in FIG. 3 includes a pointer to a sub TV center information table; the information given in FIG. 4 comprises a pointer to a lower layer SIP.

The difference information memory 6B is a RAM that stores differences between the system configurations held in the system configuration information ROM 5A on the one hand, and a desired system configuration on the other. The IHP memory 6C is a RAM that stores inhibit plug information indicating the inhibited plugs for the AV apparatuses such as the TV set 100, VTR's 30 and 40, and LDP 50. The RAM 6, SIP memory 6A, difference information memory 6B and IHP memory 6C may be constituted by a single RAM.

The micro controller 9 for D2B communication protocol is in star connection with the AV apparatuses such as the first VTR 30, second VTR 40 and LDP 50 via a D2B communication protocol IC 10 and D2B bus, i.e., through D2B control lines 21A, 21B and 21C. The micro controller 9 in this setup exchanges data and commands with the apparatuses connected thereto. In the embodiment of FIG. 1, as outlined, the TV set 100 acting as the AV center 100 is surrounded by the other AV apparatuses. The AV center 100 controls the information about the entire system configuration.

The first VTR 30 is connected to a terminal T1 of a selector 18 via an AV signal line 31. Video and audio signals are exchanged between the first VTR 30 and the selector 18. The second VTR 40 is connected to a terminal T2 of the selector 18 via an AV signal line 41. Video and audio signals are exchanged likewise between the second VTR 40 and the selector 18. The LDP 50 is connected to a terminal T3 of the selector 18 via an AV signal line 51, exchanging video and audio signals with the selector. The video and audio signals to be output by the selector 18 are determined by the CPU 4 or by the micro controller 9.

A CRT (cathode ray tube) 13 displays pictures represented by the video signal output from the selector 18. Given OSD (on-screen display) data from the micro controller 9 over the internal bus 20, the screen display IC 14 displays the data as a message in a predetermined area on the CRT 13. The audio signal output by the selector 18 is reproduced by a speaker 19.

As shown in FIG. 1, the TV set 100, acting as the AV center, comprises the control button 1, receiver 2, interface 3, CPU 4, program ROM 5, system configuration information ROM 5A, RAM 6, SIP memory 6A, difference information memory 6B, IHP memory 6C, non-volatile memory 7, clock timer 8, micro controller 9 for D2B communication protocol, D2B communication protocol IC 10, CRT 13, screen display IC 14, tuner 11, selector 18, and speaker 19.

The first VTR 30, the second VTR 40 and the LDP 50 have a micro controller for D2B communication protocol and a D2B communication protocol IC each. These components exchange commands and OSD data via the D2B control line 21.

Figure 5:
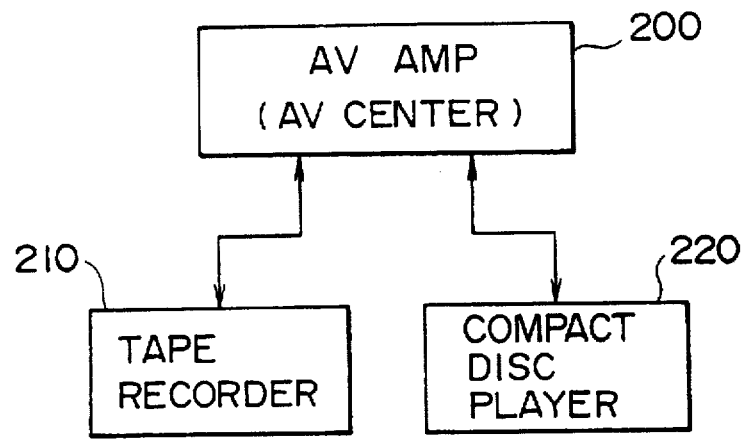
FIG. 5 is a block diagram of an AV system comprising a plurality of audio apparatuses.

FIG. 5 is a block diagram of a typical AV system comprising a plurality of audio apparatuses. In this example, an AV amplifier 200 acts as the AV center to which a tape recorder 210 and a compact disc player 220 are connected.

Figure 6:
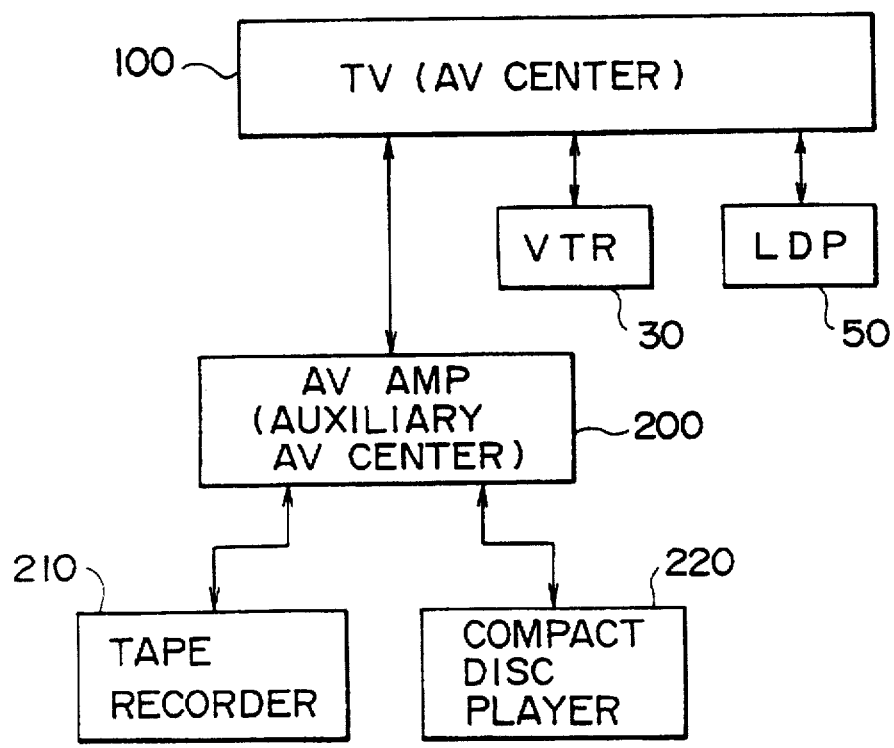
FIG. 6 is a block diagram of an AV system that adds a television (TV) set, a video tape recorder (VTR) and a laser disc player (LDP) to the AV system of FIG. 5.

FIG. 6 is a block diagram of an AV system that adds a TV set, a VTR and an LDP to the AV system of FIG. 5. In this example, the TV set 100 acts as the AV center to which the VTR 30 and LDP 50 are connected; the AV amplifier 200 works as a sub AV center to which the AV center 100 (i.e., TV set) is connected. The sub AV center stores internally the information about the apparatuses connected direct thereto (i.e., first layer). The features implemented between the apparatuses connected direct to the sub AV center may be executed without the use of the information held in the sub AV center that is provided hierarchically upward.

Figure 7:
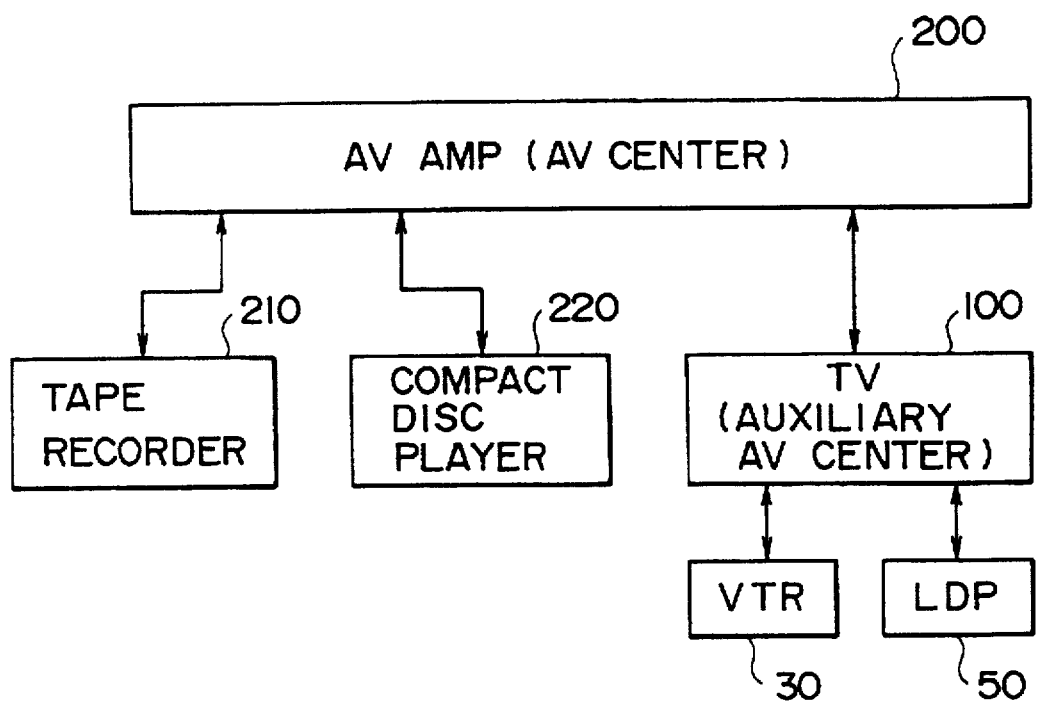
FIG. 7 is a block diagram of another AV system that adds a TV set, a VTR and an LDP to the AV system of FIG. 5.

FIG. 7 is a block diagram of another AV system that adds a TV set, a VTR and an LDP to the AV system of FIG. 5. In this example, the AV amplifier 200 is used as the AV center to which the TV set 100 is connected as the sub AV center. The VTR 30 and LDP 50 are connected to the TV set 100.

Figure 8B:
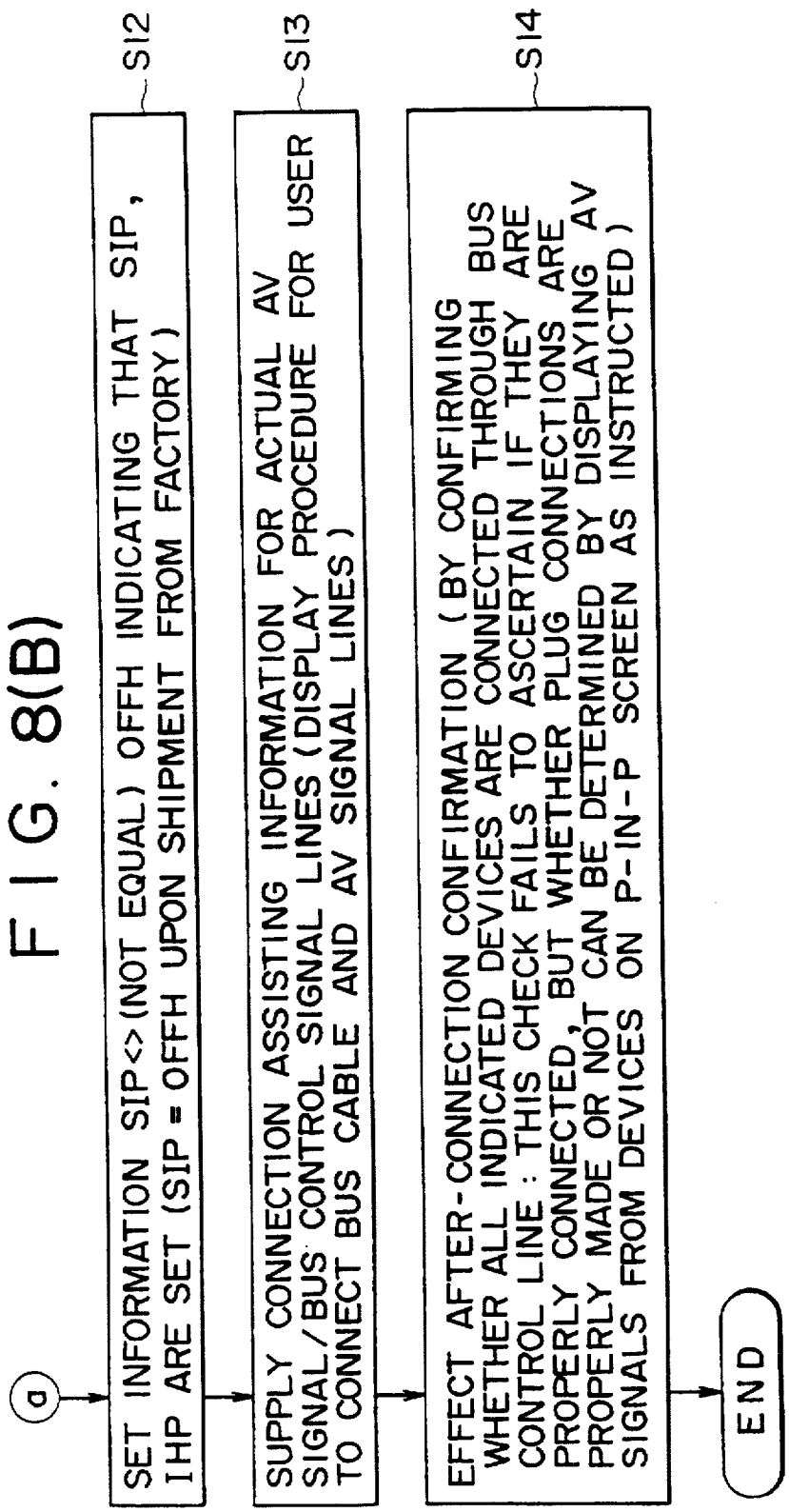
Figure 8:
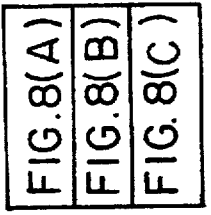
Figure 8C:
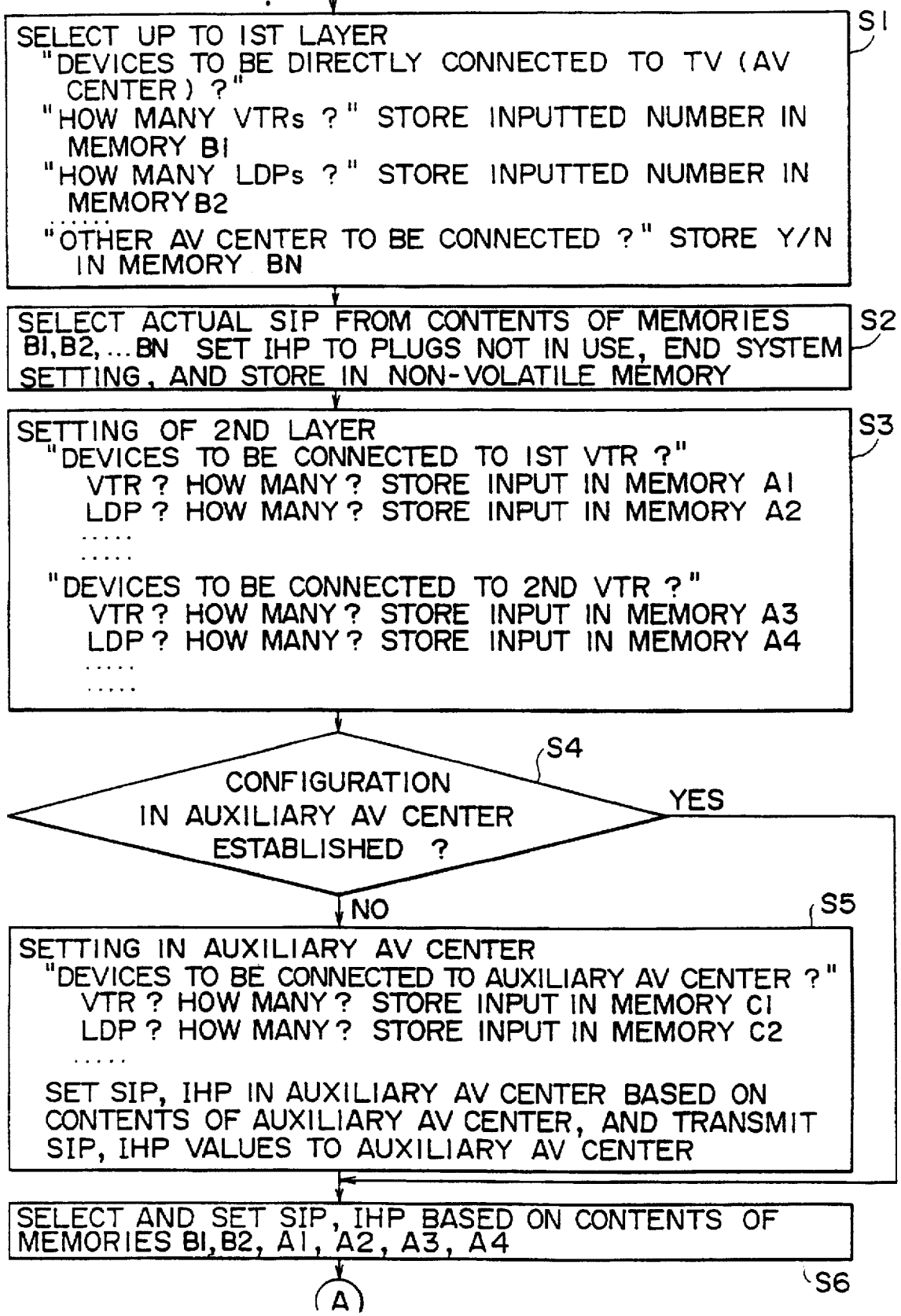

FIG. 8 is a flowchart of typical steps for setting a system configuration. Initially, the micro controller 9 for D2B communication protocol causes the screen display IC 14 to display a menu or messages on the CRT 13, thereby asking the user about the apparatuses desired to be connected to the TV 100 that is the AV center, i.e., the apparatus up to the first layer (step S1). Specifically, the micro controller 9 asks the user how many VTR's, LDP's, etc. are to be connected. The user is further asked if any other AV center is desired to be connected. The answers given by the user via the remote controller 12 or the like are placed into memories B1, B2, ... BN.

Based on the contents of the memories B1, B2, ... BN, the micro controller 9 then selects an actual SIP for temporary storage into the SIP memory 6A, sets an IHP for each unused plug, places the IHP settings in the IHP memory 6C temporarily, and stores the SIP and IHP settings in the non-volatile memory 7 (step S2). This completes the setting of the system configuration on the first layer.

The micro controller 9 goes on to set the system configuration on the second layer. That is, the micro controller 9 causes the screen display IC 14 to display a menu or messages on the CRT 13, asking the user about more apparatuses desired to be connected to the apparatuses which are already connected to the AV center 100, i.e., the apparatuses on the second layer (step S3). Specifically, the micro controller 9 asks the user the type and the number of apparatuses desired to be connected to the first VTR, second VTR, etc. The answers given by the user via the remote controller 12 or the like are placed into memories A1, A2, A3, A4, etc.

Next, the micro controller 9 checks to see if a system configuration is already set in the sub AV center (step S4). If the configuration setting is already made, step S6 is reached. If the configuration setting has yet to be made, step S5 is reached.

In step S5, the micro controller 9 causes the screen display IC 14 to display a menu or messages on the CRT 13, thereby asking the user the type and the number of apparatuses desired to be connected to the sub AV center. The answers given by the user via the remote controller 12 or the like are placed into memories C1, C2, etc. Based on the contents of the memories C1, C2, etc., the micro controller 9 then selects the SIP of the sub AV center for temporary storage into the SIP memory 6A, sets an IHP for each unused plug, places the IHP settings in the IHP memory 6C temporarily, stores the SIP and IHP settings in the non-volatile memory 7, and transmits the SIP and IHP settings to the sub AV center.

In step S6, the micro controller 9 selectively establishes the SIP and IHP settings according to the contents of the memories B1, B2, ..., A1, A2, etc. The micro controller 9 then checks to see if the system configuration designated by the user coincides with any of the predetermined system configurations about which the information is stored in the ROM 5A (step S7). If the designated system configuration does not correspond to any predetermined system configuration, the micro controller 9 checks to see if the differences between the user-designate system configuration and the predetermined system configurations are stored in the difference information memory 6B (step S8). If the result of the check in step S8 is affirmative, the content of the difference information memory 6B is placed in the non-volatile memory 7 (step S9). If the appropriate difference information is not found in the difference information memory 6B ("NO" in step S8), the micro controller 9 causes the screen display IC 14 to display on the CRT 13 an indication of the unavailability of the system configuration setting, whereby the user is prompted to make another configuration setting (step S10). If the user makes another setting ("YES" in step S11), the micro controller 9 returns to the start of the flowchart in FIG. 8. If no further setting is to be made, the micro controller 9 terminates its processing.

If the user-designated system configuration coincides with one of the predetermined system configurations ("YES" in step S7), step S12 is reached. Step S12 is also reached if the appropriate difference information is found (step S8) and placed into the non-volatile memory 7 (step S9). In step S12, the information indicating that the SIP and IHP are set is established. With step S12 completed, support information about connecting the actual AV signal/bus signal control lines is provided (step S13). After being established, the system configuration is verified (step S14). Specifically, a check is made through the bus control lines to see if all the designated apparatuses are configured. Whether or not the plug connections are correct is confirmed by having the AV signals from the individual apparatuses detected and displayed on the screen.

According to the steps in FIG. 8, the system configuration is selected on each of individual layers. It is easy for the user to make a relatively small number of choices on each layer. Because the SIP of the AV center and that of the lower layer are used for configuration control, the entire system configuration is controlled using less data in the initial setup than in conventional setups in which the configuration information is handled without being layered.

If the desired configuration on the second layer is found to coincide with one of the predetermined system configurations (i.e., existing SIP settings), the flag information designated by the SIP in the ROM is utilized (e.g., SIP No. 8, SIP No. 9, etc.). If the desired configuration does not correspond to any of the predetermined configurations, the appropriate difference information is stored in the non-volatile memory 7. This situation may occur where the AV center has fewer plugs than are required for the user-designated configuration. Configuring the system can be considerably simplified if the difference information is not stored, i.e., if the system is configured within the range of apparatus combinations involving the AV center and a single sub AV center, the combinations being represented by the SIP and IHP settings alone.

In conventional AV systems, each component apparatus has information only about the apparatuses connected immediately thereto. The result is the conventional control of information about all component apparatuses on a single layer. If any one of the features (e.g., push-to-start playback) is to be carried out, the particular apparatus that executes the feature is required to complete the necessary connection throughout the system. With each component apparatus possessing information only about its directly connected apparatuses, it may happen that the target apparatus that executes a particular feature is remote from those immediately adjacent to the apparatus that request that feature to be carried out. In that case, it is necessary to transmit a connection instruction from one apparatus to the next through the system until the target apparatus is reached.

Unlike conventional setups, the AV system embodying the invention does not adopt a distributed architecture. That is, the AV system centers on its AV center that retains information about the entire system configuration. When a particular feature is to be carried out, the system of the present invention sets the connection between the component apparatuses without forwarding the connection instruction over the bus all the way to the target apparatus.

However, taking on control over the system configuration information in the above setup can become unduly burdensome on the AV center. This bottleneck is bypassed by use of SIP settings for system configuration control. Since permitting indefinite variations of system configuration poses inordinate strains on the storage and control capabilities of the AV center, it is desirable to limit the configured apparatuses to a practical number of layers so as to keep system characteristics in optimum balance (i.e., throughput, data quantity, and a controllable number of configured apparatuses).

More specifically, predetermined system configurations (represented by the SIP settings) should preferably be limited to two layers. A large number of AV plugs should preferably be furnished to the AV center so that the configured apparatuses will be confined to the first layer as much as possible, with the configuration designated by the SIP. For system expansion, there should preferably be provided predetermined system configurations to choose from, each of them including one sub AV center.

When the user desires a system configuration comprising a sub AV center, the value of the pointer to a sub AV center plug connection information table is to be defined in "POINTER TO EXT AUXILIARY AV CENTER INFORMATION TABLE" of the system configuration information provided in basic SIP settings, as shown in FIGS. 3 and 4.

Figure 9A:
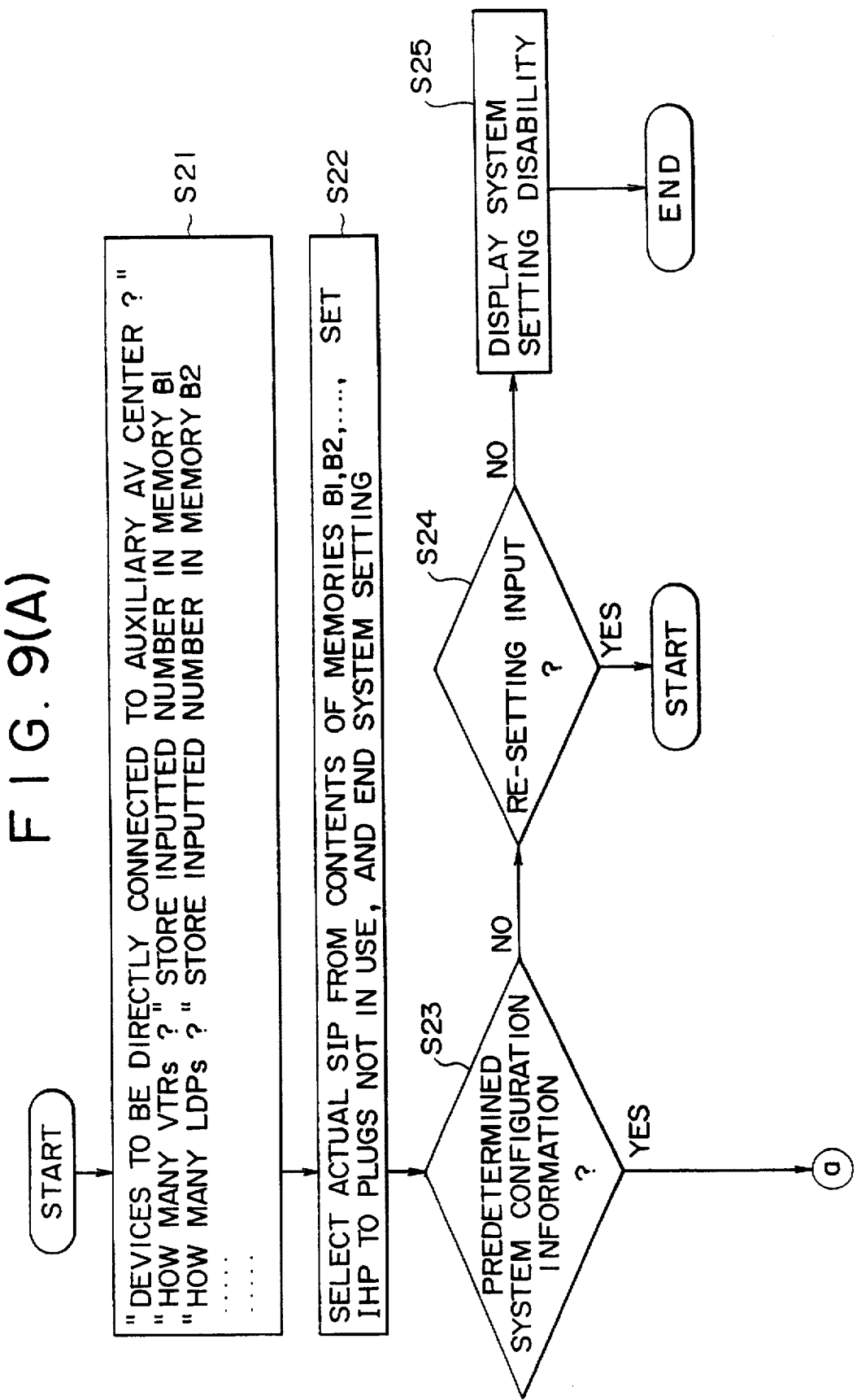

FIG. 9 is a flowchart of steps for setting an AV center using a sub AV center in such a manner that the entire system is set up simply. Initially, the micro controller for D2B communication protocol of the sub AV center displays a menu or messages asking the user to designate the type and the number of apparatuses to be connected to the sub AV center. The answers given by the user are stored in the memories B1, B2, . . . (step S21).

Based on the contents of the memories B1, B2, etc., the micro controller then selects an actual SIP for temporary storage into the SIP memory, sets an IHP for each unused plug, places the IHP settings in the IHP memory temporarily, and stores the SIP and IHP settings in the non-volatile memory to complete the setting of the system configuration (step S22).

Next, the micro control for D2B communication protocol checks to determine if the system configuration designated by the user coincides with any of the predetermined system configurations (step S23). If the designated system configuration does not correspond to any predetermined system configuration, the micro controller checks to determine if another configuration setting is desired (step S24). If the user wants to make another setting ("YES" in step S24), the micro controller returns to the start of the flowchart in FIG. 10. If no further setting is to be made, the micro controller terminates its processing by displaying the unavailability of system configuration setting (step S25).

If the user-designated system configuration coincides with one of the predetermined system configurations ("YES" in step S23), the information indicating that the SIP and IHP are set is established (step S26). With step S26 completed, support information about connecting the actual AV signal/bus signal control lines is provided (step S27). After being established, the system configuration is verified (step S28). Specifically, a check is made through the bus to determine if all the designated apparatuses are configured. Whether or not the plug connections are correct is confirmed by having the AV signals from the individual apparatuses detected and displayed on the screen.

Figure 10C:
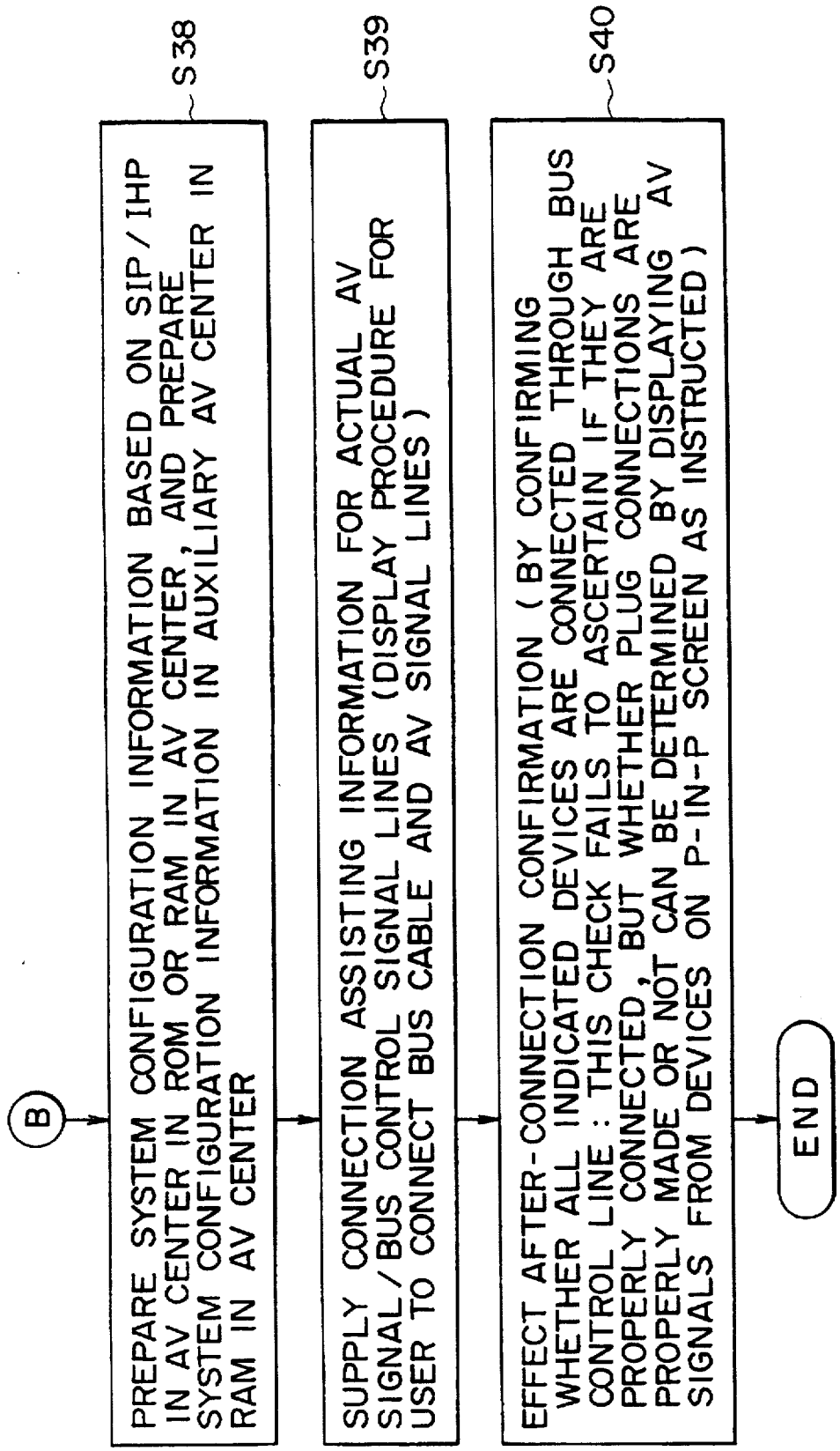

FIG. 10 is a flowchart of steps for setting a system configuration centering on the main AV center using a sub AV center in such a manner that the entire system is set up simply. The micro controller 9 for D2B communication protocol causes the screen display IC 14 to display a menu or messages on the CRT 13 asking the user about the apparatuses desired to be connected to the TV set 100 which acts as the AV center (step S31). Specifically, the user is asked to designate how many VTR's, LDP's, etc. are to be connected. The user is further asked if a sub AV center is desired to be connected. The user's answers given through the remote controller 12 or the like are stored in the memories B1, B2, . . . BZ.

Based on the contents of the memories 1, 2, . . . Z, the micro controller 9 selects an actual SIP for temporary storage into the SIP memory 6A, sets an IHP for each unused plug, places the IHP settings in the IHP memory 6C temporarily, and stores the SIP and IHP settings in the non-volatile memory 7 (step S32). The micro controller 9 then causes the screen display IC 14 to display the established system configuration on the CRT 13 (step S33).

If the user makes an entry indicating that the desired system configuration is the same as the displayed configuration ("YES" in step 34), the micro controller 9 for D2B communication protocol checks via the D2B bus to see if a system configuration is already set in the sub AV center (step S35). If a system configuration is found to be set in the sub AV center, step S38 is reached immediately. If a system configuration has yet to be set in the sub AV center, step S37 is reached.

In step S37, the micro controller 9 for D2B communication protocol causes the screen display IC 14 to display a menu or messages on the CRT 13 asking the user the type and the number of apparatuses desired to be connected to the sub AV center. The answers given by the user through the remote controller 12 or the like are stored in the memories C1, C2, etc. Based on the contents of the memories C1, C2, etc., the micro controller 9 then selects the SIP for temporary storage into the SIP memory 6A, sets an IHP for each unused plug, places the IHP settings in the IHP memory 6C temporarily, stores the SIP and IHP settings in the non-volatile memory 7, and transmits the SIP and IHP settings to the sub AV center.

In step S38, the micro controller 9 prepares in the RAM 6 the system configuration information based on the SIP and IHP settings in effect in the AV center, and prepares also in the RAM 6 the system configuration information in effect in the sub AV center. In step S39, support information about connecting the actual AV signal/bus signal control lines is provided. After being established, the system configuration is verified (step S40). Specifically, a check is made through the bus to determine if all the designated apparatuses are configured. Whether or not the plug connections are correct is confirmed by having the AV signals from the individual apparatuses detected and displayed on the screen.

Adopting a system configuration involving a sub AV center eliminates the need for discarding the previously used system configuration to make another configuration setting all over again from the beginning. A newly added system may be established upwards of the existing system (in this case, the new system is used as the AV center and the existing system as the sub AV center). Alternatively, the new system may be established downwards of the existing system (in this case, the new system is used as the sub AV center and the existing system as the AV center). Illustratively, of the SIP values set in the AV center, those with 1's in the hundred's place denote the system configurations which, represented initially by the ten's and the unit's places, are supplemented by one sub AV center each.

When the user includes a sub AV center in the desired system configuration, that sub AV center should preferably be one which allows the SIP to be set and to which apparatuses of one layer are allowed to be connected. When the presence of a sub AV center is designated during the setting of the AV center, an SIP value higher than, say, 100 may be established accordingly. Where both the SIP and the IHP are used, the SIP may illustratively be assigned from the beginning to values higher than 100; the defined SIP values lower than 100 may be allocated to other system configurations.

Figure 11A:
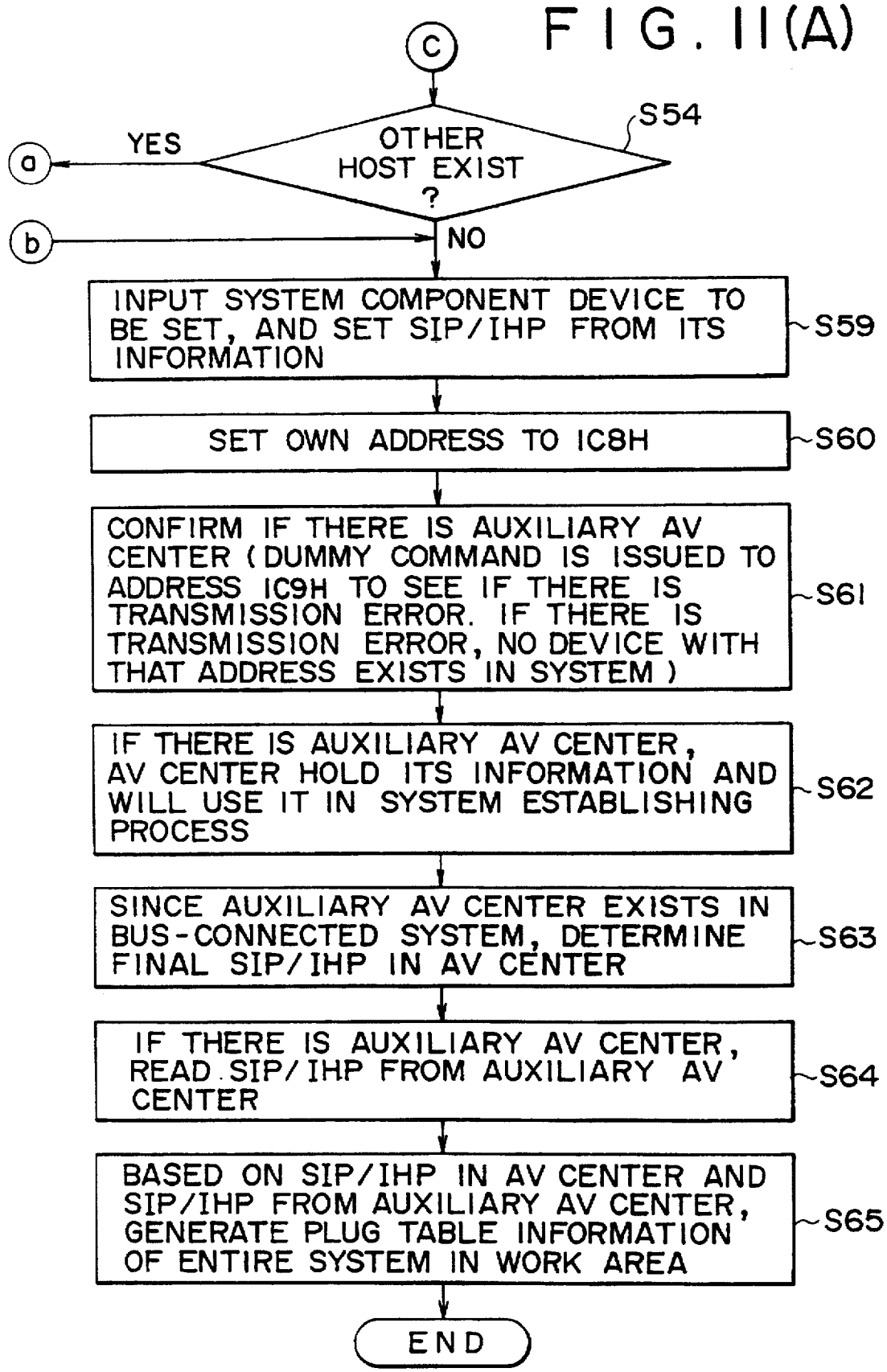

FIG. 11 is a flowchart of steps for setting an AV center. The precondition for the AV center to be set is that the subordinate apparatuses including the sub AV center be connected to the AV bus and that the communication-related parts of these apparatuses be turned on. Initially, the micro controller 9 for D2B communication protocol of the apparatus in question displays a menu or messages asking the user whether or not to set the current apparatus as the AV center (step S51). If the user decides not to set the apparatus as the AV center, the micro controller 9 thereof displays a menu or messages asking the user whether or not to set the apparatus as a sub AV center (step S52). If the user decides not to set the apparatus as a sub AV center, the micro controller 9 terminates its processing. If the user decides to set the apparatus as a sub AV center, the micro controller 9 goes to the processing of FIG. 9.

If the user designates that the apparatus is to be set as the AV center in step S51, the micro controller 9 for D2B communication protocol of that apparatus checks to determine if any other apparatus within the system is already set as the AV center (step S53). Specifically, the micro controller 9 transmits a dummy command to address 1C8H (i.e., address of the AV center) to determine if a transmission error occurs. If the error does occur, that confirms the absence of any other AV center within the system.

If another AV center does exist in the system ("YES" in step S54), the micro controller 9 checks to determine if there exists a sub AV center (i.e., apparatus having address 1C9H) in step S55. If the sub AV center does exist ("YES" in step S56), a warning indication appears on the screen (step S57).

If no sub AV center is found to exist in step S56, the micro controller 9 sends a command in step S58 to the apparatus having address 1C8H (AV center) instructing it to become a sub AV center (having address 1C9H).

If no other AV center is found to exist ("NO" in step S54), or after step S58 is completed, step S59 is reached. In step S59, the micro controller 9 prompts the user to input a desired system configuration, and sets the SIP and IHP according to the configuration entered. With step S59 completed, the micro controller 9 for D2B communication protocol sets the address of the apparatus in question for 1C8H so that it acts as the AV center (step S60). The micro controller 9 then checks to determine if a sub AV center exists in the system (step S61). Specifically, a dummy command is sent to address 1C9H to determine if a transmission error occurs. If the error does occur, that confirms the absence of any apparatus having that address (i.e., sub AV center) within the system. When the presence of the sub AV center is confirmed, the micro controller of the AV center, i.e., the apparatus in question, retains the information about the sub AV center for use in setting the system configuration (step S62). After it is determined whether or not the sub AV center exists within the bus-connected system, micro controller the finalizes the SIP and IHP of the AV center (step S63).

If the sub AV center exists, the micro controller of the apparatus in question (i.e., AV center) retrieves the SIP and IHP settings from that sub AV center (step S64). Based on the retrieved SIP and IHP settings and on those in the AV center, the micro controller prepares plug table information about the entire system in a work area (step S65).

FIG. 12 is a flowchart of steps for keeping selected system configuration information unchanged. In step S71, the micro controller 9 for D2B communication protocol causes the screen display IC 14 to display a menu or messages on the CRT 13 asking the user about the apparatuses desired to be connected to the TV set 100 acting as the AV center (i.e., apparatuses on the first layer). Specifically, the user is asked to designate how many VTR's, LDP's, etc. are to be connected. The user is further asked if a sub AV center is desired to be connected. The user's answers given through the remote controller 12 or the like are stored in the memories B1, B2, . . . BZ.

Based on the contents of the memories B1, B2, . . . BZ, the micro controller 9 selects an actual system configuration for storage into memory (step S72). This completes the setting of the system configuration on the first layer.

The micro controller 9 goes on to set the system configuration on the second layer. That is, the micro controller 9 causes the screen display IC 14 to display a menu or messages on the CRT 13 asking the user about more apparatuses desired to be connected to the apparatuses which are already connected to the AV center 100, i.e., the apparatuses on the second layer (step S73). Specifically, the micro controller 9 asks the user the type and the number of apparatuses desired to be connected to the first VTR, second VTR, etc. The answers given by the user via the remote controller 12 or the like are placed into the memories A1, A2, A3, A4, etc.

The micro controller 9 then checks to determine if a system configuration is already set in the sub AV center (step S74). If the configuration setting is already made, step S76 is reached. If the configuration setting has yet to be made, step S75 is reached.

In step S75, the micro controller 9 causes the screen display IC 14 to display a menu or messages on the CRT 13, thereby asking the user the type and the number of apparatuses desired to be connected to the sub AV center. The answers given by the user via the remote controller 12 or the like are placed into the memories C1, C2, etc. Based on the contents of the memories C1, C2, etc., the micro controller 9 then sets the system configuration of the sub AV center, and transmits the system configuration information to the sub AV center.

In step S76, the micro controller 9 sets the system configuration information according to the contents of the memories A1, A2, A3, A4, etc. The micro controller 9 then furnishes support information about connecting the actual AV signal/bus signal control lines (step S77). After being established, the system configuration is verified (step S78).

If the names of the apparatuses connected to the AV plugs of the apparatus in question as well as the numbers of these AV plugs were stored unmodified in memory, i.e., as entered in FIG. 12 and, the data could take up a considerable space in memory. The arrangement would be costly, particularly if a non-volatile memory (NVRAM) is used for recovery of the system configuration information from removal of power.

According to the invention, the required capacity of the non-volatile memory is minimized by use of a limited amount of information. The scheme involves controlling the overall system configuration information based on the differences between SIP's to predetermined system configuration information on the one hand, and the actually desired system configuration on the other.

Under the scheme, of the present invention only a minimum capacity of the non-volatile memory is needed in cases where any one of the predetermined system configurations represents the desired configuration. It should be noted that the scheme requires allocating an NVRAM area in which to accommodate information about the presence or absence of difference information, as well as an NVRAM area in which to store the difference information.

In order to set the SIP and to select the IHP, the following menus need only be displayed consecutively to let the user select information about the desired system configuration:

"Do you want to connect VTR's?" (YES/NO) "If you do, how many VTR's?" (1, 2, 3, etc.)

"Do you want to connect LDP's?" (YES/NO)

"Do you want to connect AAMP's (audio amplifiers)?" (YES/NO)

"Do you want to connect VTU's (video tuners)?" (YES/NO)

If the AV center (TV set) has numerous plugs, it is relatively easy for the user to configure desired apparatuses. This is because the AV center plugs accommodate all apparatuses configured and there is no need to consider connecting more apparatuses on lower layers. During the selection process, a schematic view representing the actual system configuration may be displayed on the screen. This allows the user to make the selection with ease. If there is any apparatus to be configured on a lower layer, the user responds to the interrogatory menu asking about the apparatuses to be connected downward following the entry of "YES" or "NO" in the menu. In response to the questions) of the menu, the user selects a desired apparatus(es) for the lower layer. If the downward apparatus to be selected is a sub AV center, the selection process should follow the AV center setting menu.

The user is initially requested to designate the number of apparatuses to be connected to the AV center. If all plugs attached to the AV center fail to accommodate the designated apparatuses, the system displays a schematic view of a second-layer configuration allowing the user to make alternative connection.

FIGS. 13(A)–13(C) are a set of views showing typical displays that allow the user to set a desired system configuration easily. At the start of initialization, the micro controller for D2B communication protocol provides the display of FIG. 13 (A). In this view, the cursor is positioned on the leftmost "VTR" indication. In this state, the user is asked to push a SELECT key. Pushing the SELECT key switches the leftmost position display, with the cursor remaining in that position, from the VTR to an LDP to a SUB AV CENTER, etc. After the setting in the leftmost position is completed, the cursor is moved right one position ("VTR" closer to the display center in this case). Then the SELECT key is operated likewise to select the LDP, SUB AV CENTER, etc., in that position.

The settings for the sub AV center may be made on the sub AV center side. Alternatively, these settings may be entered into the screen of FIG. 13 (A) and transmitted later to the sub AV center.

If the settings for the sub AV center are to be made in the screen of FIG. 13 (A), it is necessary to call up on the screen a sub AV center setting screen such as one shown in FIG. 13 (B). The steps to follow thereafter are the same as those described above. When established, the information is transferred to the sub AV center. Because transmitting the established information updates the system configuration information currently in effect in the sub AV center, the user might want to verify if the existing system configuration information can be updated before transferring the information to the sub AV center.

When the setting of the system configuration on the second layer is selected, the screen of FIG. 13 (A) is replaced by that of FIG. 13 (B). The user then sets, say, an LDP or LDP's in the manner described.

Conventionally, once main power is removed, the system configuration information is erased and needs to be set all over again upon power-up. To avoid the chore typically requires storing the existing system configuration information in a non-volatile memory before removal of power. When power is restored, the system configuration information is retrieved from the non-volatile memory.

However, to store system configuration information in unmodified format necessarily involves accommodating a large quantity of information, which is costly. By contrast, the embodiment of the invention utilizes the above-mentioned SIP scheme to minimize the amount of system configuration information to be stored in the non-volatile memory. The SIP-based information storage involves not storing the system configuration information as is but retaining pointers to that information. This reduces the amount of information to be actually stored while ensuring the same benefits of information storage as before.

With the reduced quantity of information required to be stored and controlled, there is no need to furnish a dedicated non-volatile memory for accommodating system configuration information. A partial area in a channel-selection non-volatile memory originally furnished in the TV set and like apparatuses is sufficient for storing the pointers.

Under the inventive scheme, control information about the non-volatile memory, e.g., information about whether the memory is set or has yet to be set, is limited. It follows that a relatively simple procedure needed only be used to manage the memory control information.

Figure 14:
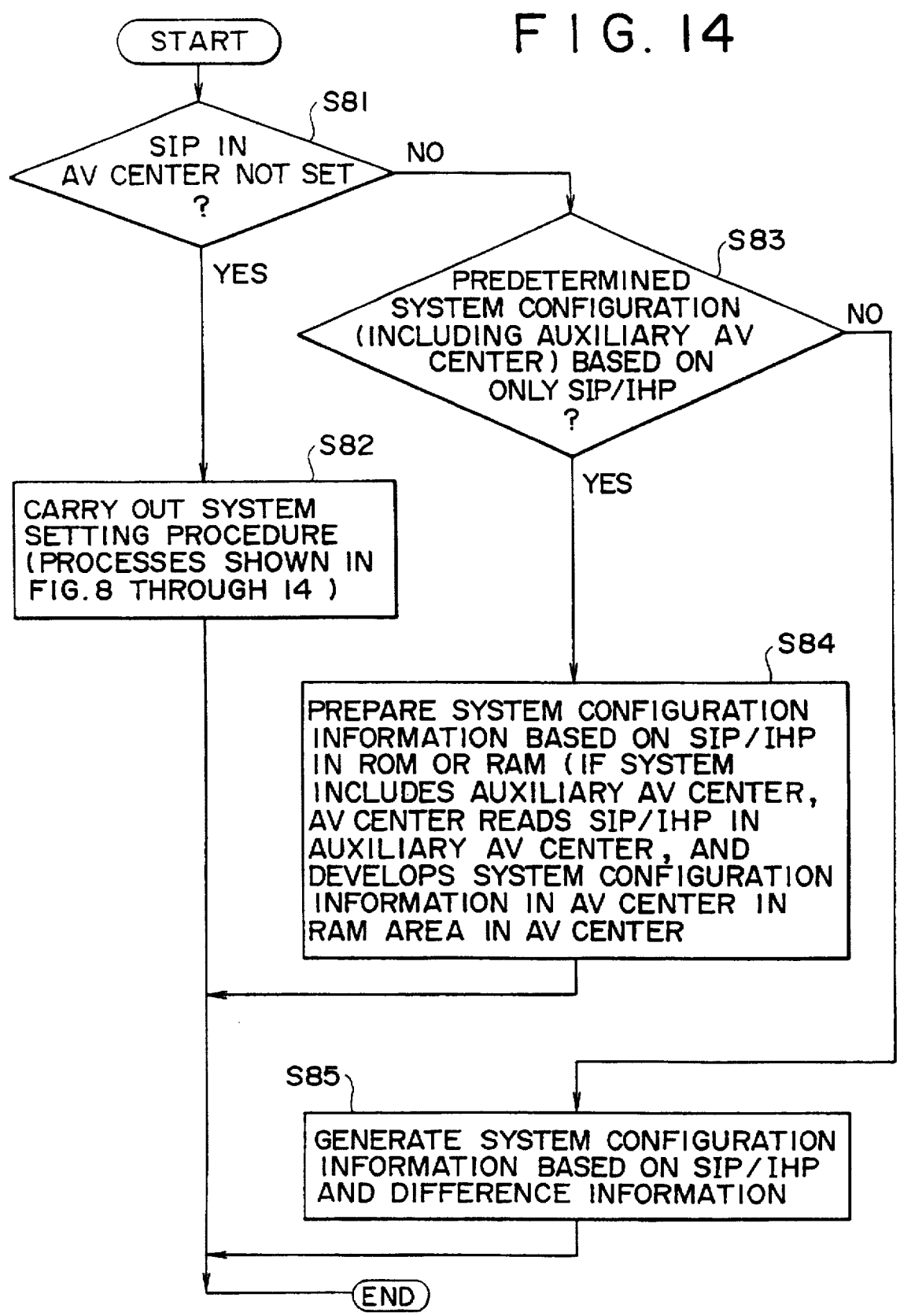
FIG. 14 is a flowchart of steps for dealing with the transition from main power-off to main power-on status.

FIG. 14 is a flowchart of steps for dealing with the transition from main power-off to main power-on status. If the SIP of the AV center has yet to be set ("YES" in step S81), the micro controller for D2B communication protocol performs the steps for setting the system configuration (step S82) before reaching the main processing.

If the SIP of the AV center is already set, the micro controller for D2B communication protocol checks to determine if the information denotes a predetermined system configuration composed of the SIP and IHP (step S83). If the result of the check in step S83 is affirmative, the system configuration information based on the SIP and IHP is prepared in the RAM (step S84). (If the configuration includes a sub AV center, the micro controller of the AV center reads the SIP and IHP from the sub AV center so as to develop the system configuration information about the sub AV center in the RAM area of the AV center). Thereafter, the main processing is reached.

If the system configuration information does not denote any predetermined system configuration composed of the SIP and IHP ("NO" in step S83), the micro controller prepares system configuration information according to the difference information between the predetermined system configuration information based on the SIP and IHP and the user-requested system configuration (step S85). The micro controller then goes to the main processing.

How the SIP and IHP are used will now be described. The use of the IHP is one way to implement an actual system configuration with minimum SIP definitions. For example, combining a number higher than, say, 101 with the IHP eliminates the need for defining the SIP for a number lower than 100.

The use of SIP-IHP combinations makes it possible to substitute "SIP+IHP" settings representing large system configurations for the settings of system configurations with plugs fewer than those of the default SIP patterns. As a result, a relatively small amount of a ROM data table is needed for accommodating predetermined system configuration information. It should be noted that a non-volatile RAM for the IHP is required in this setup. With the IHP, up to 8 plugs may be subjected to ON/OFF control using a single byte. Thus 4 bytes are needed to deal with the SIP and IHP settings of the AV center and the sub AV center. If the total number of plugs for the two centers is 8 or less, a three-byte memory area is sufficient.

FIG. 15 depicts how the SIP and IHP settings are typically used. In this example, SIP No. 9 involves a TV set (with 4 plugs), a VTR 1 (P1), a VTR 2 (P2), a VTR 3 (P3) and an LDP (P4) combined with IHP settings.

What follows is a description of how more complicated system configurations are controlled using relatively simple control data under a scheme where the sub AV center and the AV center divide their tasks appropriately:

Suppose that the address of the AV center is fixed to a unique address of, say, 1C8H in the system; if there is one sub AV center, its address is set for 1C9H; if there are two sub AV centers, their addresses are set for 1C9H and 1CAH; and if there are three sub AV centers, their addresses are set for 1C9H, 1CAH and 1CBH. Each sub AV center supports only the apparatuses directly connected thereto. Specifically, each sub AV center stores its system configuration information about the apparatuses directly connected thereto by use of SIP and IHP settings.

Each sub AV center possesses its own means for making the SIP and IHP settings. In some cases, the AV center may set the system configuration for the sub AV center(s) connected downwards thereof. In such cases, the system configuration information for the sub AV center may be transmitted thereto for storage from the AV center.

How to switch from the AV center to a sub AV center and vice versa will now be described. A TV set or like apparatus may be defined as the AV center having address 1C8H (defining the AV center). This requires the AV center candidate as a precondition to possess capabilities allowing the user to set the address thereof. Illustratively, a TV set or like apparatus may have its address defined either for stand-alone use (e.g., 100H, . . . 100H) or for use as the AV center (with address 1C8H). If the user defines a TV set as the AV center, it is necessary for the TV set to accommodate the system configuration information.

It may happen that an AV center already exists in the system when the user defines a TV set as a new AV center (e.g., the AV amplifier is already set as the AV center, on condition that the bus signal lines are connected). In that case, an on-screen warning indication appears on the TV set (which the user has tried to set as the AV center). After recognizing the warning, the user sets this apparatus (i.e., TV set) as the new AV center anyway. The process redefines the existing AV center as a sub AV center. At this point, a check is made using the SIP/IHP settings to see if the apparatuses connected to the sub AV center are furnished on a single layer (i.e., connected directly). Specifically, the new AV center transmits to the apparatus with address 1C8H (e.g., AV amplifier) a command instructing it to become a sub AV center having another address. Thereafter, the new AV center changes its address to 1C8H.

Another check is made to see if the old AV center has address 1C9H. If the address has yet to be used, that address is used as that of the sub AV center (e.g., AV amplifier). If address 1C9H is already used, the next higher address (1CAH) is reached and a check is made to determine if the incremented address is already used. (The address is incremented by 1 starting from 1C9H. With addresses up to 1CFH, a total of 7 sub AV centers may be defined in the system).

Figure 16:
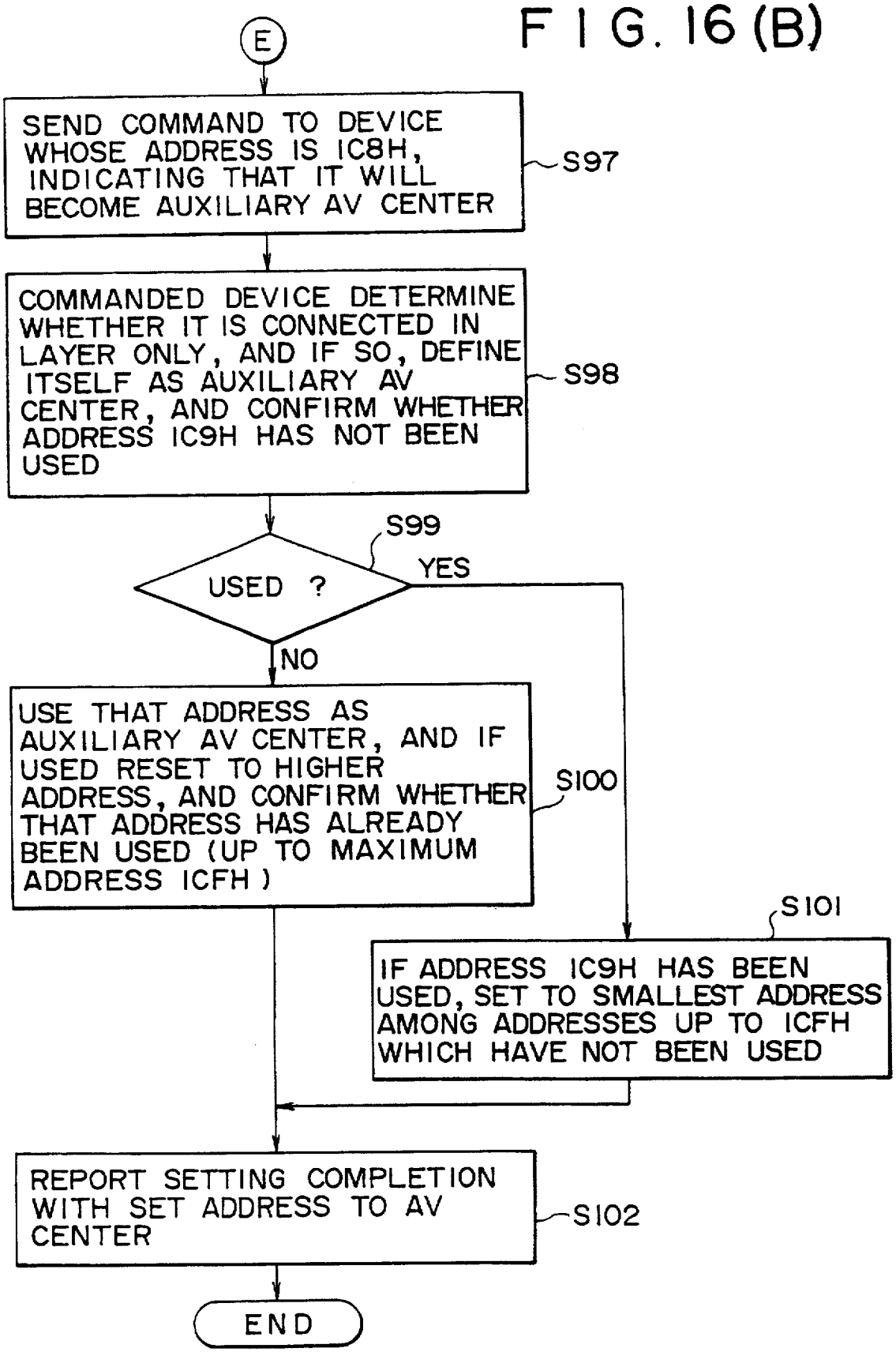

FIG. 16 is a flowchart of steps for setting the AV center in another way. Initially, the micro controller for D2B communication protocol of the apparatus in question displays a menu or messages asking the user if the apparatus is desired to be set as the AV center of the system (step S91). If the user responds in the negative, the micro controller of the apparatus in question terminates its processing.

If the user responds in the affirmative in step S91 to set the apparatus as the AV center, the micro controller of the apparatus in question checks to determine if there already exists the AV center in the system (step S92). Specifically, the micro controller for D2B communication protocol transmits a dummy command to address 1C8H (i.e., the address of the AV center) to determine if there occurs a transmission error. If the transmission error does occur, that confirms the absence of any other AV center in the system.

When the absence of the AV center is verified ("YES" in step S93), the micro controller of the apparatus in question sets its address for 1C8H so as to turn it into the AV center (step S94). The micro controller for D2B communication protocol then checks to determine if there is any sub AV center in the system (step S95). If the presence of a sub AV center is detected, the micro controller of the AV center (i.e., the apparatus in question) preserves the information about the sub AV center for use in setting a system configuration (step S96).

If the AV center is found to exist already in step S93, the micro controller transmits to the existing AV center (with address 1C8H) a command instructing it to become a sub AV center (having address 1C9H) in step S97.

The micro controller for D2B communication protocol of the apparatus having received the command checks internally to determine if the apparatus is connected on the first layer alone. If the result of the check is affirmative, the apparatus is defined internally as a sub AV center. Another check is made to determine if address 1C9H is already used (step S98). If address 1C9H has yet to be used ("NO" in step S99), that address is utilized as that of the sub AV center (step S100); if address 1C9H is already used ("YES" in step S99), the lowest of the unused addresses up to 1CFH is utilized as the address of the sub AV center (step S101). The address thus established is transmitted to the AV center, with completion of the system configuration setting also reported thereto (step S102).

Below is a description of how a system configuration is typically set (automatically in part). Suppose that one TV set and two VTR's exist and that the user designates these apparatuses on the initial system setting screen. In that case, the micro controller for D2B communication protocol of the AV center selects a system configuration "SIP NO.=106" and transmits a dummy command to addresses 1C9H, 1CAH, . . . 1CFH to determine if any sub AV center is configured. When the micro controller of the AV center verifies the presence of a sub AV center, the micro controller sets a mask bit in the IHP for the flag of that sub AV center.

When the micro controller for D2B communication protocol selects the system configuration "SIP NO.=109," those apparatuses not actually connected are also assigned. All supposedly configured apparatuses receive a certain command (e.g., inquiry command) each according to the SIP setting. Transmitting the command to any nonexistent apparatus results in a transmission error which confirms the absence of that apparatus.

The micro controller for D2B communication protocol of the AV center then transmits a dummy command to addresses 1C9H, 1CAH, ... 1CFH to determine if any sub AV center is connected. If the presence of a sub AV center is verified, a mask bit is set in the IHP setting of the AV center for the flag of that sub AV center.

With the SIP number left unchanged, the information about the unconnected apparatuses is then stored in memory. The SIP number and the unconnected apparatus information are used for system configuration control. Ideally, the unconnected apparatus information should be accommodated in one byte. This is because the non-volatile memory for storing channel selection information may be utilized to accommodate the SIP number and the unconnected apparatus information if they combine to take up two bytes only.

Where the single byte arrangement is sufficient to deal with simple system configurations, up to 8 plugs may be controlled for use and nonuse. That is, if the AV center has a maximum of 8 plugs, the single byte memory portion may be used to inhibit some of those plugs of the AV center which are designated by the SIP, even if the SIP setting is somewhat larger than usual.

System checks may be performed in response to an on-screen display menu after the setting of the SIP number. Alternatively, with the SIP selected, a check may be made to determine if the apparatuses configured are actually connected to the bus. It should be noted that whether or not the AV signal lines are properly connected to the plugs cannot be verified with these checks. The plug connections are confirmed illustratively by having a video signal from the reproducing apparatus checked using the pin P.

Of the accompanying drawings, FIGS. 17 through 20 are views showing examples of SIP settings; FIGS. 21 through 26 are views of typical AV system configurations; and FIGS. 27 through 30 are views depicting other examples of SIP settings.

Although the examples given above deal primarily with AV systems, the invention is not limited thereto. The invention may also be applied to communication systems for use on board such transportation equipment as aircraft, vehicles, electric trains, ships and buses; to personal computer communication systems; to systems that combine the personal computer with AV apparatuses; to systems for controlling remotely located devices using modems (over telephone lines or by radio); and to other diverse systems.

To recapitulate the description above, one benefit of the invention is as follows: when one of a plurality of AV apparatuses is set as the AV center and at least one of the remaining apparatuses as a sub AV center, the invention allows the apparatuses of the audio group and those of the video group to be interconnected and to function normally as a system under the AV center.

Another benefit of the invention derives from the fact that in the present AV system, the newly designated AV center issues a command to the existing AV center instructing it to become a sub AV center. That is, when a new system is to be configured, only the apparatus desired to be used as the new AV center needs to be set up.

A further benefit of the invention lies in the fact that the AV center of the present AV system perceives the entire system configuration using pointers to the ways in which to connect the component AV apparatuses, and that each sub AV center perceives its own configuration using pointers to the AV apparatuses directly connected to that sub AV center. This makes it possible, by use of only a small amount of memory capacity, to continue carrying out the features of the old system even after the new system configuration comes into effect.

An even further benefit of the invention stems from the fact that each sub AV center is allowed to ask the AV center to make the connections it needs; each sub AV center need only have information about the apparatuses directly connected thereto. The arrangement makes it possible to execute the features of a given apparatus without the sub AV center having to possess information about the entire system configuration.

As many apparently different embodiments of this invention may be made without departing from the spirit and scope thereof, it is to be understood that the invention is not limited to the specific embodiments thereof except as defined in the appended claims.

What is claimed is:

1. An audio video system for a plurality of apparatuses interconnected with an external bus line, the system comprising:

a first apparatus operating as a control center of said audio video system, including:

an internal bus, an audio and/or video device, a first controller for controlling via said internal bus an operation of said first apparatus operating as a control center of said audio video system, another apparatus of said plurality of apparatuses connected via said external bus to said first apparatus, a second controller for controlling an operation of said another of said plurality of apparatuses connected to said external bus line, wherein said second controller is controlled by said first controller via said internal bus, a program memory connected to said internal bus for storing a program with instructions to control said first controller and/or said second controller, a display member for displaying a status of said audio video system and for providing visual feedback to a user during system setup, a selector connected to said internal bus for selecting an audio and/or video signal produced by one of said plurality of apparatuses connected to said external bus line, a clock timer connected to said internal bus for generating a system clock signal, user input means connected to said internal bus for permitting the user of said audio video system to enter operating commands and a desired system configuration, a system configuration information memory connected to said internal bus for storing a plurality of predetermined system configurations, a system information pointer memory connected to said internal bus for storing a pointer identifying one of said plurality of predetermined system configurations stored in said system configuration information memory, a difference information memory connected to said internal bus line for storing differences between said plurality of predetermined system configurations stored in said system configuration information memory and said desired system configuration entered by the user using said user input means, an inhibit plug bit memory connected to said internal bus for storing information indicating unused plugs corresponding to unused apparatuses of said plurality of apparatuses connected to said external bus, and a non-volatile memory connected to said internal bus for storing data relating to a connection status among said plurality of apparatuses after power to said video system is removed.

2. The audio video system as claimed in claim 1, further comprising a further apparatus operating as a sub-control center of said audio video system, wherein said further apparatus is connected to said first apparatus via said external bus.

3. The audio video system as claimed in claim 1, wherein said user input means comprises a remote controller emitting infrared rays.

4. The audio video system as claimed in claim 2, wherein said first apparatus and said another apparatus communicate with each other to avoid a conflict of control operations of said audio video system.

5. The audio video system as claimed in claim 1, wherein said external bus line is a Domestic Digital Bus.

6. The audio video system as claimed in claim 1, further comprising a loudspeaker connected to said selector.

* * * * *